(12) United States Patent
Gimple et al.

(10) Patent No.: US 11,907,243 B2
(45) Date of Patent: Feb. 20, 2024

(54) CORE RECONCILIATION SYSTEM WITH CROSS-PLATFORM DATA AGGREGATION AND VALIDATION

(71) Applicant: Confie Holding II Co., Huntington Beach, CA (US)

(72) Inventors: Jay K. Gimple, Stevenson Ranch, CA (US); Jonathan Laughery, Livingston, LA (US)

(73) Assignee: Confie Holding II Co., Huntington Beach, CA (US)

( * ) Notice: Subject to any disclaimer, the term of this patent is extended or adjusted under 35 U.S.C. 154(b) by 0 days.

(21) Appl. No.: 17/483,636

(22) Filed: Sep. 23, 2021

(65) Prior Publication Data

US 2022/0100770 A1 Mar. 31, 2022

Related U.S. Application Data

(60) Provisional application No. 63/092,262, filed on Oct. 15, 2020, provisional application No. 63/083,258, filed on Sep. 25, 2020.

(51) Int. Cl.
| | | |
|---|---|---|
| *G06F 16/215* | (2019.01) | |
| *G06F 16/23* | (2019.01) | |
| *G06F 16/25* | (2019.01) | |

(52) U.S. Cl.
CPC .......... *G06F 16/252* (2019.01); *G06F 16/215* (2019.01); *G06F 16/2365* (2019.01)

(58) Field of Classification Search
None
See application file for complete search history.

(56) References Cited

U.S. PATENT DOCUMENTS

| 6,128,602 A | 10/2000 | Northington et al. |
|---|---|---|
| 2005/0187852 A1 | 8/2005 | Hwang |

(Continued)

OTHER PUBLICATIONS

Raconteur.net, "Data Economy Financial Services", Jul. 2, 2017, see p. 6: "Driving Change: It Starts With Your Data". (Year: 2017).*

(Continued)

*Primary Examiner* — Scott A. Waldron
(74) *Attorney, Agent, or Firm* — Ravi Mohan; Rutan & Tucker, LLP

(57) ABSTRACT

Systems and methods for validating and reconciliating data with a core reconciliation (recon) device. The core recon device may be configured to receive data from various data stores from various different independent systems. The core recon device may be configured to facilitate users such as agents or brokers to perform cross-platform data queries from all the data stores from all the independent systems. In embodiments, the core recon device may be configured to receive all the cross-platform queried data and then validate and reconcile all the received data into a single processor assignment queue. In the embodiments, the core recon device may be used by the user to identify any particular type of desired discrepancies from all the queried data. In the embodiments, the core recon device may then be used by the user to respectively work towards verifying and rectifying the identified discrepancies stored within the processor assignment queue.

20 Claims, 9 Drawing Sheets

(56) References Cited

U.S. PATENT DOCUMENTS

| | | | |
|---|---|---|---|
| 2007/0179833 A1* | 8/2007 | Moorthy | G06Q 50/184 |
| | | | 705/310 |
| 2012/0117039 A1 | 5/2012 | Apte et al. | |
| 2016/0127465 A1 | 5/2016 | Barstow et al. | |
| 2018/0189332 A1 | 7/2018 | Asher et al. | |
| 2019/0080248 A1* | 3/2019 | Kohli | G06N 5/025 |
| 2020/0387976 A1* | 12/2020 | Bull | G06Q 20/405 |
| 2021/0081896 A1* | 3/2021 | Winn | G06F 40/30 |

OTHER PUBLICATIONS

FIS, "FIS' IntelliMatch: Reinventing Reconciliations", (2019) 8 pages. (Year: 2019).*

Friedman, JP, "Dictionary of Business Terms", Barron's Educational Series, Inc., 3rd edition (2000), p. 571 ("Reconciliation"). (Year: 2000).*

Miller, S. et al., "Build a distributed big data reconciliation engine using Amazon EMR and Amazon Athena", Amazon Web Service, Aug. 3, 2020.

PCT International Search Report and Written Opinion, PCT Application No. PCT/US2021/052002, dated Dec. 24, 2021.

* cited by examiner

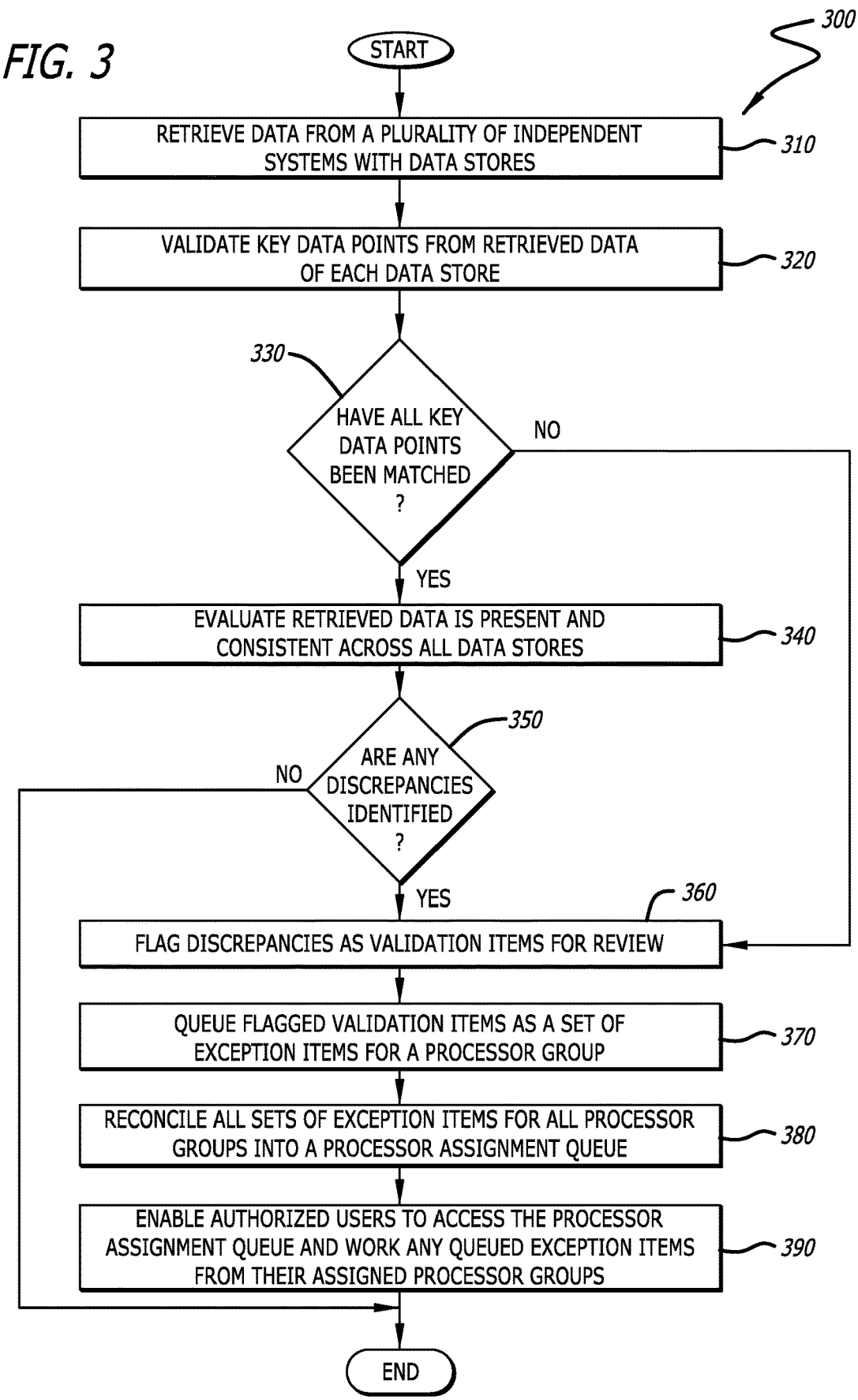

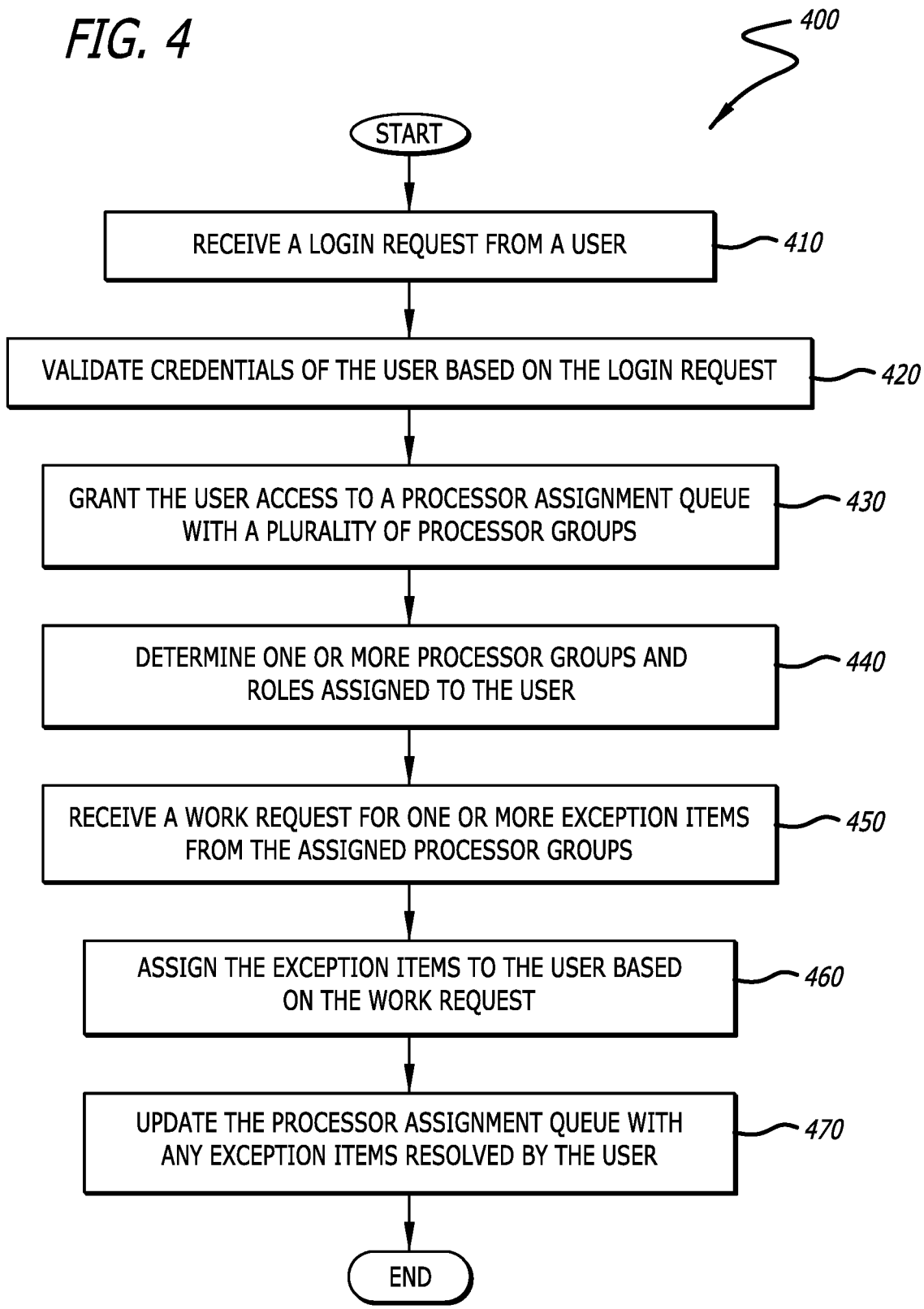

CORE RECONCILIATION SYSTEM WITH CROSS-PLATFORM DATA AGGREGATION AND VALIDATION

PRIORITY

This application claims the benefit of and priority to U.S. Provisional Application No. 63/092,262, filed Oct. 15, 2020, and U.S. Provisional Application No. 63/083,258, filed Sep. 25, 2020, both of which are incorporated in their entireties herein.

FIELD

The field of the present disclosure generally relates to insurance systems. More particularly, the present disclosure relates to identifying discrepancies across various independent data systems and rectifying the identified discrepancies within a core reconciliation system.

BACKGROUND

Insurance brokers typically act as intermediaries for their clients, which may be entities seeking insurance coverage for certain risks. The insurance brokers bring prospective clients together with one or more insurance carriers who may be willing and able to provide the desired insurance policies and coverage on beneficial terms for their prospective clients. For example, these insurance policies are typically issued by the one or more insurance carriers and may be serviced through the insurance brokers. As a result, there are often two or more different and independent systems of records for any given policy data for each insurance policy.

In addition, insurance brokers are dependent upon various types of data that are typically stored in various data stores within various independent systems. For example, a host of transactions depend on data being present and valid in each key data source, such as commissions, premium finance funding, cancellations, reinstatements, endorsements, renewals, bank deposits, etc., and those transactions cannot be processed correctly without all the various independent systems aligning. As a result, it is critical to the operational and financial processes of the insurance brokers that the various types of data are accurately reflected in each of these independent systems and that the data may be reconciled into a more practicable central system.

However, this has led many insurance brokers to use cross-system verifications to validate and reconcile those various data types and points with processing staffs who typically verify each of the data types and points manually. Due to the volume of business handled by most insurance brokers, these cross-system verifications are both labor intensive and highly prone to human error. This has also led to inaccurate or out-of-sync data being stored in these independent systems and data stores, which further leads to errors in key financial and operational processes.

BRIEF DESCRIPTION OF DRAWINGS

The above, and other, aspects, features, and advantages of several embodiments of the present disclosure will be more apparent from the following description as presented in conjunction with the following several figures of the drawings. The drawings refer to embodiments of the present disclosure in which:

FIG. 3 is a detailed flowchart illustration of a method for implementing cross-platform validation, reconciliation, and cleansing of data points with a core recon system, in accordance with an embodiment of the present disclosure;

FIG. 4 is a flowchart illustration of a method for administering users of a core recon device having processor groups, user roles, and a processor assignment queue with a plurality of exception items, in accordance with an embodiment of the present disclosure;

DETAILED DESCRIPTION

Figure 1:
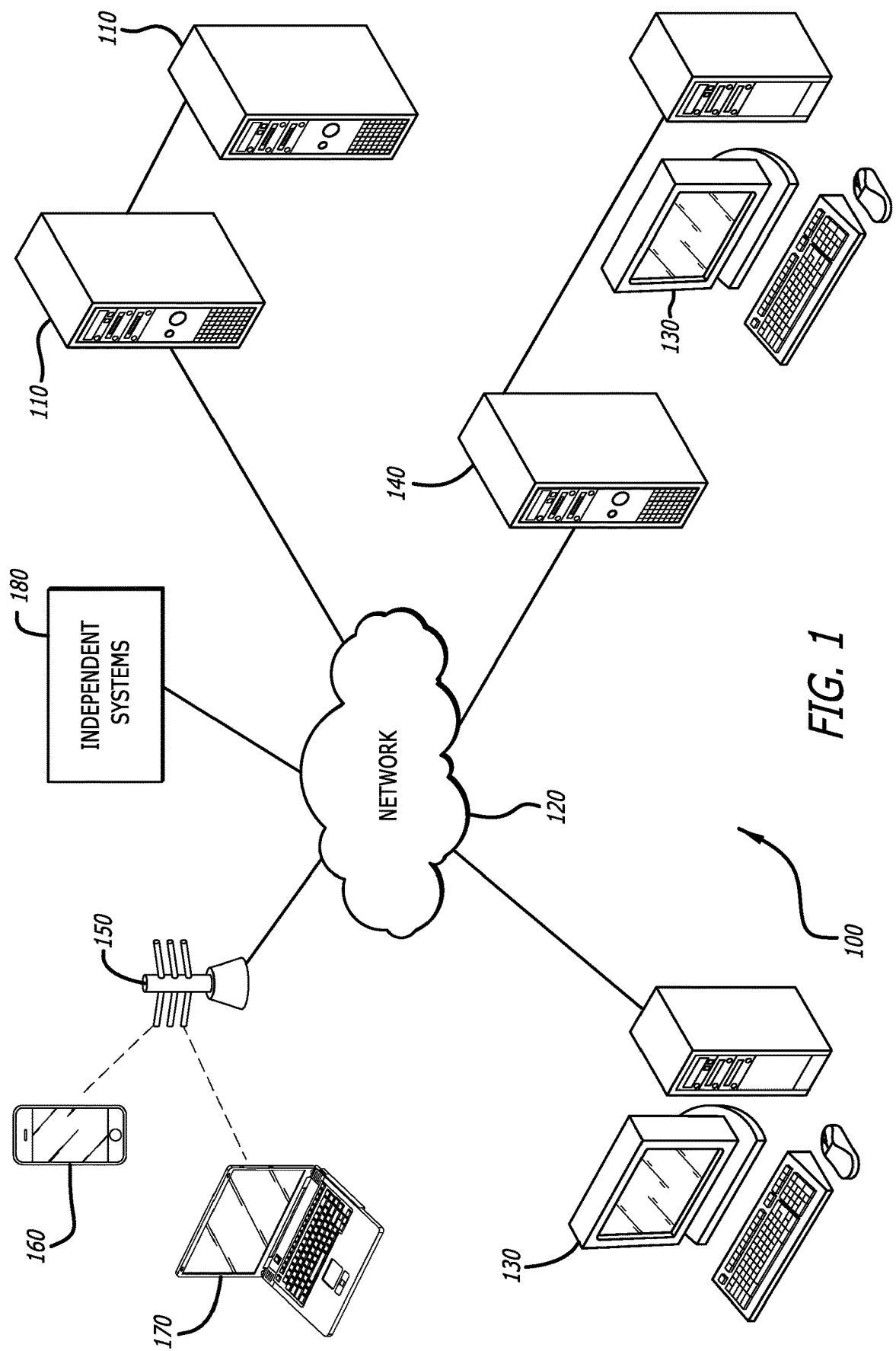
FIG. 1 is an exemplary illustration of a core reconciliation (recon) system, in accordance with an embodiment of the present disclosure.

The embodiments described herein relate to systems and related methods for validating and reconciling data with a core recon device. As described in greater detail below, the embodiments particularly relate to systems and methods for the core recon device to verify and rectify data from various data stores from various different independent systems. In the embodiments, the core recon device may be configured to facilitate users such as agents and/or brokers to perform cross-platform data queries from all the data stores within all the independent systems. In the embodiments, the core recon device may be configured to receive the cross-platform queried data, and then validate and reconcile the received data into a single processor assignment queue. In the embodiments, the core recon device may be used by the users to identify any particular types of desired discrepancies from all the received data. For example, in the embodiments described below, the core recon device may be used by the users to respectively work towards rectifying all those identified discrepancies that are all properly stored, classified, and filtered within the singular processor assignment queue.

Before some particular embodiments are provided in greater detail, it should be understood that the particular embodiments provided herein do not limit the scope of the concepts provided herein. It should also be understood that a particular embodiment provided herein may have features that may be readily separated from the particular embodiment and optionally combined with or substituted for features of any number of other embodiments provided herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," "forward," "reverse," "clockwise," "counter clockwise," "up," "down,"

or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise. Unless defined otherwise, all technical and scientific terms used herein have the same meaning as commonly understood by those of ordinary skill in the art.

Aspects of the present disclosure may be embodied as an apparatus, system, method, and/or computer program/application product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like. A component, as used herein, comprises a tangible, physical, non-transitory device. For example, a component may be implemented as a hardware logic circuit comprising custom circuits, gate arrays, or other integrated circuits; off-the-shelf semiconductors such as logic chips, transistors, or other discrete devices; and/or other mechanical or electrical devices.

A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In some embodiments, a circuit may include custom circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware or the like). A circuit may comprise one or more silicon integrated circuit devices (e.g., chips, die, die planes, packages, etc.) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As used herein, reference to reading, writing, storing, buffering, processing, and/or transferring data may include the entirety of the data, a portion of the data, a set of the data, and/or a subset of the data. Likewise, reference to reading, writing, storing, buffering, processing, and/or transferring non-host data may include the entirety of the non-host data, a portion of the non-host data, a set of the non-host data, and/or a subset of the non-host data.

Further, aspects of the present disclosure are described below with reference to schematic flowchart diagrams and/or schematic block diagrams of methods, apparatuses, systems, and computer program/application products according to embodiments of the disclosure. It will be understood that each block of the schematic flowchart diagrams and/or schematic block diagrams, and combinations of blocks in the schematic flowchart diagrams and/or schematic block diagrams, may be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

Lastly, in the following detailed description, reference is made to the accompanying drawings. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring now to FIG. 1, an illustration of a core recon system 100 is shown, in accordance with embodiments of the present disclosure. In embodiments, the core recon system 100 may include one or more carrier management systems (CMSs) 110, one or more agency management systems (AMSs) 130, one or more core recon devices 140, and one or more independent systems 180. In the embodiments, one or more of the AMSs 130 may be communicatively coupled to one or more of the CMSs 110 over a network, such as the Internet and/or the like. As described above, insurance systems generally require two or more disparate systems working together to insure and provide policies to their customers. For example, insurance policies may typically be issued by a carrier such as the CMSs 110, and may then be serviced through one or more agents and/or brokers such as the AMSs 130. As a result, there are often two or more primary systems of records for any given insurance policy in addition to the one or more independent systems 180, which may also store other important data related to any given insurance policy.

For example, the first primary system may be one of the AMSs 130, which may often be created by the agents and/or brokers at the time of the policy's creation. While, the second primary system may be one of the CMS 110, which may often be created in response to the AMS 130 notifying the CMS 110 of the new policy's creation that is ready for intake. In the embodiments, the AMS 130 may typically transmit new policy data to the CMS 110 in response to opening the new policy. When the new policy is created, the AMS 130 may then connect the new customer to interact directly with the CMS 110 to facilitate, for example, direct and/or recurring payments. When this occurs, the new insured customer may begin to directly interact with the CMS 110 instead of the AMS 130. As such, upon the creation of the new policy, at least two or more nearly identical sets of policy data for the new customer may exist between both the AMS 130 and CMS 110.

Often, the CMS 110 may function as, or be in communication with a web server that may provide methods for customers to directly interact and add policy data to the CMS 110. A customer may then communicate with the CMS 110 through any type of known user computing device such as a laptop 170, a mobile computing device 160, and so on, which may communicate directly over the network 120 and/or through one or more wireless access points 150. For example, the known user computing devices may be any type of communicative computing devices capable of being used by the customer, which may include, but are not limited to, a personal computer (PC), a laptop computer, a mobile device, a tablet computer, a smart watch, a personal digital assistant device (PDA), a handheld communications device, a vehicle computer system, an embedded system controller, a consumer electronic device, any combination thereof, etc.

In some embodiments, this direct communication between the customer and the CMS 110 may thus create a one-sided update of policy data which may not be automatically reflected in the AMS 130. For example, the customer may initially add bank account data for recurring payments upon account creation with the AMS 130, but the customer may subsequently change bank accounts or switch to one-time payments by adding in a credit card number and associated payment authorization data while communicating with the CMS 110. After the initial account creation, the two sets of policy data for the customer on the AMS 130 and CMS 110 may start to differentiate. In the above example, the AMS 130 would not have any data related to the change in bank accounts or of the payment authorization data with the CMS 110, which is a key data point associated with the customer. Over time, such differences in key data points may evolve and grow larger for this customer in conjunction with all the other customers associated with the AMS 130 and the CMS 110.

As described in the above embodiments, the core recon system 100 may be implemented to manage such differences in key data points between the one or more AMSs 130 and the one or more CMSs 110 in addition to any differences in key data points between any AMSs 130 and/or CMSs 110 and the one or more independent systems 180, which also store other key data points related to the insured customers, policies, and/or the like. For example, the AMSs 130 may have operational and financial processes based on data which resides in the one or more independent systems 180. That is, a host of transactions associated with the AMSs 130 rely on data being present, valid, and accurate in each key data store or source of each AMS 130, CMS 110, and/or independent system 180. In particular, transactions involving one or more key data points such as commissions, premium finance funding, cancellations, reinstatements, endorsements, renewals, bank deposits, etc., may not be processed correctly without each data store of each AMS 130 aligning with the other data stores of the other respective AMSs 130, CMSs 110, and independent systems 180.

In the embodiments, the independent systems 180 may be implemented as one or more disparate systems having their own independent data stores, which may be used to store any particular type of data related to customers, policies, carriers, agencies, banks, commissions, premium finance funding, cancellations, reinstatements, endorsements, renewals, any combinations thereof, and so on. The independent systems 180 may be comprised of, but not limited to, agency systems, premium finance systems, carrier systems, banking systems, financing systems, underwriting systems, commission statement repositories/systems, carrier agreement systems, bank statement repositories/systems, third party systems, any combination thereof, and/or any other desired disparate systems and data repositories. As such, as noted in the examples above, the data stored by any of the one or more AMSs 130, CMSs 110, and independent systems 180 is critical to any of the other respective AMSs 130, CMSs 110, and independent systems 180, and needs to be accurately reflected in each of the respective data stores, such that the data may be effectively reconciled by, for example, the core recon device 140.

In embodiments, the core recon device 140 may be implemented by the core recon system 100 to facilitate any of the one or more AMSs 130, CMSs 110, and/or independent systems 180 by enabling cross-platform validation and reconciliation of data stored across any of the respective data stores. For example, the core recon device 140 may be used by the AMS 130 to identify any particular type of discrepancies (i.e., differences) based on the validated data and respectively work towards rectifying those identified discrepancies as reconciled data via a processor assignment queue of the core recon device 140.

As illustrated and described below in further detail, the core recon device 140 may be implemented with one or more different configurations based on the desired design and/or application. For example, the core recon device 140 may be implemented as a computing device having an internal browser-based application and configured to be system agnostic, which enables the device to therefore have the processing capabilities needed to query data from any of the AMSs 130, CMSs 110, and/or independent systems 180. In certain embodiments, the core recon system 100 may utilize the core recon device 140 to provide data processing, data storage, data retrieval, data validation, and/or data reconciliation required by the one or more AMSs 130.

In the embodiments, the core recon device 140 may be configured and utilized for a variety of purposes, which may include, but not limited to: (i) enabling cross-platform verification and reconciliation of key data across any of the various disparate systems and data stores described herein; (ii) validating that the values of the key data points of the data from each data store matches with each other; (iii) ensuring the validated data from each data store is present and consistent; (iv) flagging any discrepancies from the validated data that may be missing, inconsistent, and/or need further review; (v) queuing flagged validation items as a set of exception items for processor groups to review; (vi) reconciling all sets of exception items for all processor groups into a processor assignment queue; (vii) enabling authorized users to access the processor assignment queue and work any queued exception items from their assigned processor groups; cleansing and removing the need to check every data item and validate its accuracy manually; and (viii) utilizing machine learning capabilities with the validation data queries to remove the need to look at any correct data items and only provide the data items that truly need further review by the users of the processor groups. It should be understood that the core recon device 140 may be utilized by any devices, data stores, systems, and related methods of the core recon system 100 to respectively validate and reconcile any particular type of data, without limitation.

In most embodiments, the core recon device 140 may be configured to build one or more validations cases and retrieve (or scrape, query, receive, etc.) data from the validations cases associated with any of the AMSs 130, CMSs 110, and/or independent systems 180, such that the retrieved data may represent a plurality of exception items assigned to any given processor group's queue with the name(s) of the validation case(s). Administrators of the core recon device 140 may be able to perform administrative duties on objects such as users, roles, and processor groups. For example, as described in greater detail below, an administrator may utilize the core recon device 140 to assign a user to one or more processor groups and one or more roles for each of the assigned processor groups. In addition, the administrator, who may be a user with a supervisor role or the like, may have the ability to grant or deny access to the user, and may be able to see dashboards of exception items in the processor assignment queues as well as the user's audit trails on any particular exception queue items.

Furthermore, in the embodiments, the core recon device 140 may be implemented by the one or more agents/brokers of the AMSs 130 to retrieve any updated policy data directly from the one or more CMSs 110 and/or independent systems 180. For example, this retrieval and update process may occur periodically and/or be triggered by an external command, a predetermined threshold, and/or the like. In addition, as described above, the core recon device 140 may be configured to utilize machine learning and artificial intelligence (AI) data processing capabilities to better select which data to gather and when to gather it, to better classify and filter what items need to be reviewed by the processor groups, and to better identify what items are correct and provide only the items that need further review by the processor groups. In many embodiments, the retrieving, gathering, and/or validating of data by the core recon device 140 may be in the form of an internal browser-based application configured to be system agnostic which makes it capable of querying various disparate independent systems and data stores, and/or in the form of a generalized web scraping application that processes one or more websites that are linked to at least one or more of the CMSs 110 and/or independent systems 180.

In some embodiments, the access to one or more of the CMSs 110 may be enhanced through connections with agent/broker-specific portals and/or webpages. These webpages may be pre-existing and/or may be configured to interact directly with the core recon device 140. In some certain embodiments, access to these webpages may be restricted to authorized agents/brokers associated with the core recon device 140 and/or the AMSs 130, who may utilize a validation system to verify their access privileges. Once scraped, the retrieved data may be formatted into any suitable format that may be processed by at least one or more of the AMSs 130.

Although the one core recon device 140 in FIG. 1 is depicted as being physically separated from the one AMS 130, it should be understood that any type of configurations may be implemented and utilized by any core recon devices 140, without limitation. For example, it should be understood that any embodiments may comprise a core recon device as a software-based application that may be operated from within any of the one or more AMSs 130. Indeed, in some embodiments, the cross-platform data validation and reconciliation by the core recon device 140 may be carried out as a remote-based service or may be configured to operate directly on any of the one or more CMSs 110 and/or independent systems 180. As such, it should be understood that any operations of the core recon device 140 may be configured with any number of arrangements, for example, based on the desired design and applications, without limitation.

In embodiments below, FIGS. 2A-2D provide a series of detailed illustrations of a system 200 with a core recon device 140. The core recon device 140 depicted in FIGS. 2A-2D may include a processor 210, a communication interface 220, a memory 230, a data store 240, and a core recon unit 260 with a processor assignment queue 268. In the embodiments, the core recon 140 depicted in FIGS. 2A-2D may be substantially similar to the core recon device 140 depicted in FIG. 1. Additionally, FIGS. 2B-2D may respectively provide a more detailed illustration of the processor assignment queue 268, the memory 230, and the data store 240 of the core recon device 140.

Figure 2A:
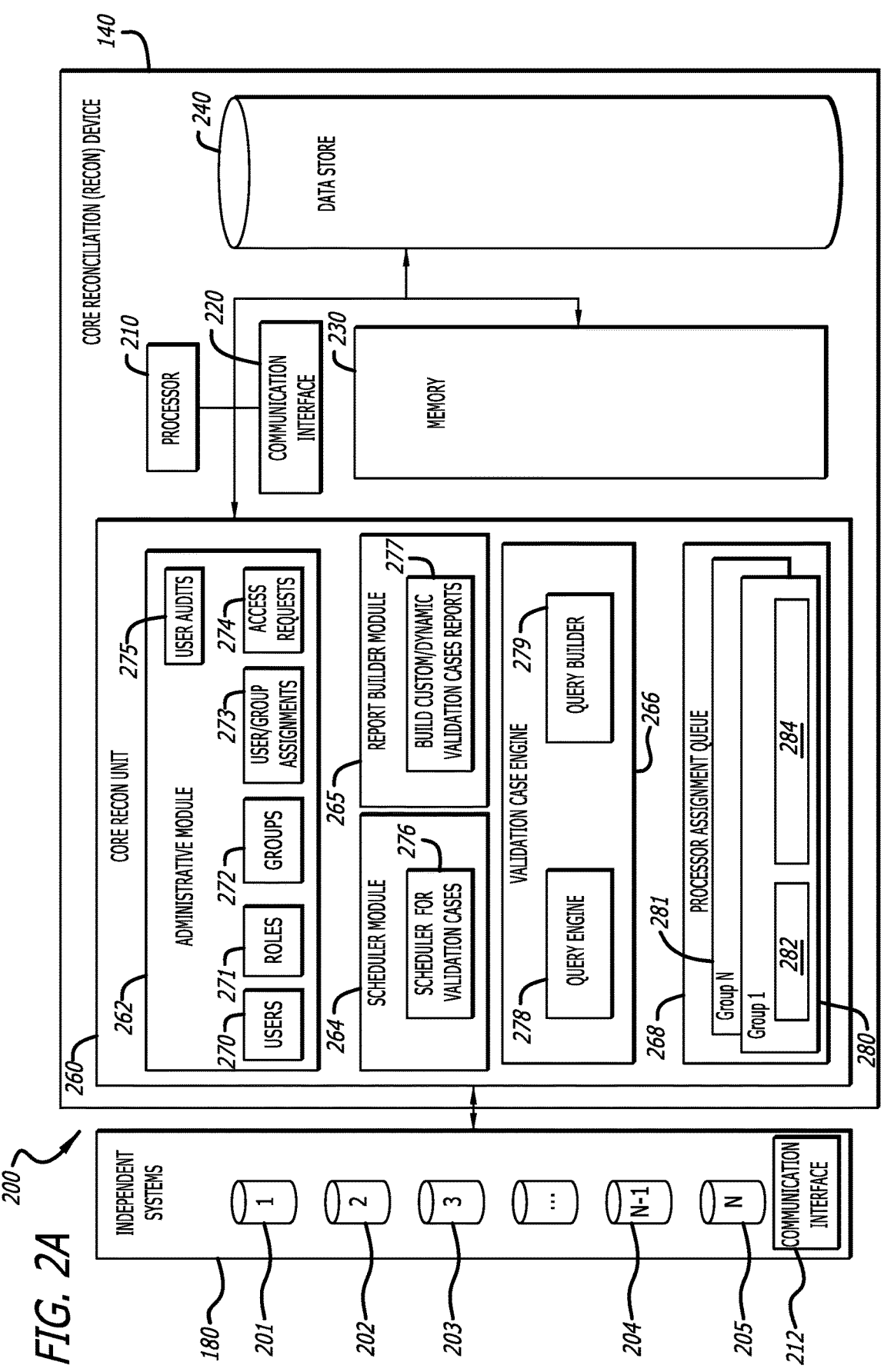
FIGS. 2A-2D are detailed illustrations of a core recon device, in accordance with an embodiment of the present disclosure.

Referring now to FIG. 2A, an illustration of the core recon device 140 in the system 200 is shown, in accordance with embodiments of the present disclosure. In embodiments, the system 200 may include the core recon device 140 communicatively coupled to one or more independent systems 180 with one or more data stores 201-205. The system 200 depicted in FIG. 2A may be similar to the core recon system 100 depicted in FIG. 1. For example, the system 200 may be configured to utilize both the core recon device 140 and independent systems 180 in conjunction with any other additional devices, systems, and/or networks, where the system 200 may communicatively couple the core recon 140 with one or more AMSs and/or CMSs as depicted in FIG. 1. In addition, the independent systems 180 depicted in FIG. 2A may be substantially similar to the independent system 180 depicted in FIG. 1.

In the embodiments, the independent systems 180 may include the one or more data stores 201-205 and a communication interface 212. The data stores 201-205 may represent any number of desired data stores from 1 to a Nth number ("N"). For example, the data stores 201-205 may represent a first data store 201, a second data store 202, a third data store 203, and so on, until a "N–1" data store 204 and a Nth "N" data store 205. Each of the data stores 201-205 may be associated with one or more of the independent systems 180. In embodiments, the communication interface 212 may be in communication with the core recon device 140, where the communication interface 212 may be communicatively coupled, for example, with the communication interface 220 used to communicate with the data store 240 of the core recon device 140.

As depicted in the embodiments above, the data stores 201-205 may include any type of data such as customer data, policy data, carrier data, agency data, financial/banking data, commission data, premium finance funding data, cancellations data, reinstatements data, endorsements data, renewals data, any combinations thereof, and so on. It should be understood that the data stores 201-205 may be located within a single persistent storage of the independent systems 180 as shown in FIG. 2A, but it may also be stored on one or more separate physical memory storage devices that may be located either within the independent systems 180, the system 100, the core recon device 140, one or more other devices, and/or remotely in a cloud-based server, without limitations. Also, although six data stores 201-205 and one independent system 180 are depicted in FIG. 2A, it should be understood that any number of data stores, such as one data store, two data stores, and/or seven or more data stores, may be implemented within the independent systems 180, and that any number of independent systems 180 may be utilized and communicatively coupled to the core recon device 140 and/or system 200, without limitations.

In some embodiments, the independent systems 180 may facilitate many aspects of the system 200 up to providing most of the operational and/or financial data processing necessary for the implementation of the core recon device 140 within the system 200. In other embodiments, the independent systems 180 may be used to implement any number of desired data stores necessary for the core recon device 140 and/or the system 200. In additional embodiments, the independent systems 180 may provide or supplement data processing capabilities in conjunction with the data processing capabilities of the core recon device 140, and/or may also provide ground truth data with a variety of machine learning/AI processes, predetermined rule sets, and so on.

As discussed, in the embodiments, the core recon device 140 may be embodied as a unique computing device, where the core recon device 140 may be communicatively coupled to at least the independent systems 180 as depicted in FIG. 2A, and/or where the core recon device 140 may be communicatively coupled to at least one of the AMSs 130 as depicted in FIG. 1. In certain embodiments, the core recon device 140 may be configured within an AMS, a CMS, and/or any other similar computing device/system either as one or more hardware devices, one or more software modules, any combination thereof, and/or the like. In other embodiments, the core recon device 140 may be configured as a software application such as an internal browser-based application which may be implemented to run on any type of computing device.

Referring back to FIG. 2A, the core recon device 140 may include at least one or more of a processor 210, a memory 230, a communication interface 220, a data store 240, and a core recon unit 260. The core recon device 140 may include the processor 210 coupled to the communication interface 220. The communication interface 220, in combination with a data transmission logic 235 of the memory 230 depicted in FIG. 2C, may enable the core recon device 140 to communicate with any external network devices and/or other network appliances. For example, the communication interface 220 of the core recon device 140 may be in communication with the communication interface 212 of the independent systems 180 to transmit and receive data from the one or more data stores 201-205 within the independent systems 180, such as any data from any scheduled and built validation case queries and so on.

According to some embodiments, the communication interface 220 may be implemented as a physical interface including one or more ports for wired connectors and/or the like. Additionally, or in the alternative, the communication interface 220 may be implemented with one or more radio units for supporting wireless communications with other electronic devices and systems. In the embodiments, the data transmission logic 235 depicted in FIG. 2C may include logic for performing operations of receiving and transmitting data via the communication interface 220 to enable communication between the core recon device 140, the system 200, and any other network devices via one or more networks (e.g., a network similar to the network 120 depicted in FIG. 1). For example, the core recon device 140 may be communicatively coupled to any type of external computing devices such as servers, data stores, cloud computing servers/services, one or more AMSs similar to the AMS 130 depicted in FIG. 1, and so on.

The core recon device 140 may have the processor 210 coupled to the memory 230. As shown in greater detail in FIG. 2C, the memory 230 may be a persistent storage that stores one or more logics 231-237, 252-256 as software modules used to implement one or more operations of the core recon device 140. For example, the one or more logics and software modules of the memory 230 depicted in FIG. 2C may include a policy update logic 231, a validation logic 232, a data scraping logic 233, a mapping logic 234, an error generation logic 235, the data transmission logic 236, and/or a core recon logic 237, where the core recon logic 237 may further include an administrative logic 252, a scheduler logic 253, a report builder logic 254, a validation case logic 255, and/or a processor assignment logic 256. The operations of these software modules, upon execution by the processor 210, are depicted herein. Of course, it should be understood that some or all of the logics may be implemented as hardware, and if so, such logic(s) may be implemented separately from each other, without limitation.

Furthermore, the core recon device 140 may have the processor 210 and/or the memory 230 coupled to the data store 240. As shown in greater detail in FIG. 2D, the data store 240 may comprise various types of data including, but not limited to, carrier data 241, agency data 242, scraped data 243, policy update data 244, independent systems data 245, policy data 250 that further includes data point data 251, and/or core recon data 246 that further includes administrative data 247, validation query data 248, and exceptions data 249. As previously discussed, it should be understood that any number of data types and logics may be configured in any number of configurations based on the desired design/application, which may include combining, omitting, and/or adding data types and logics, without limitation.

Figure 2B:
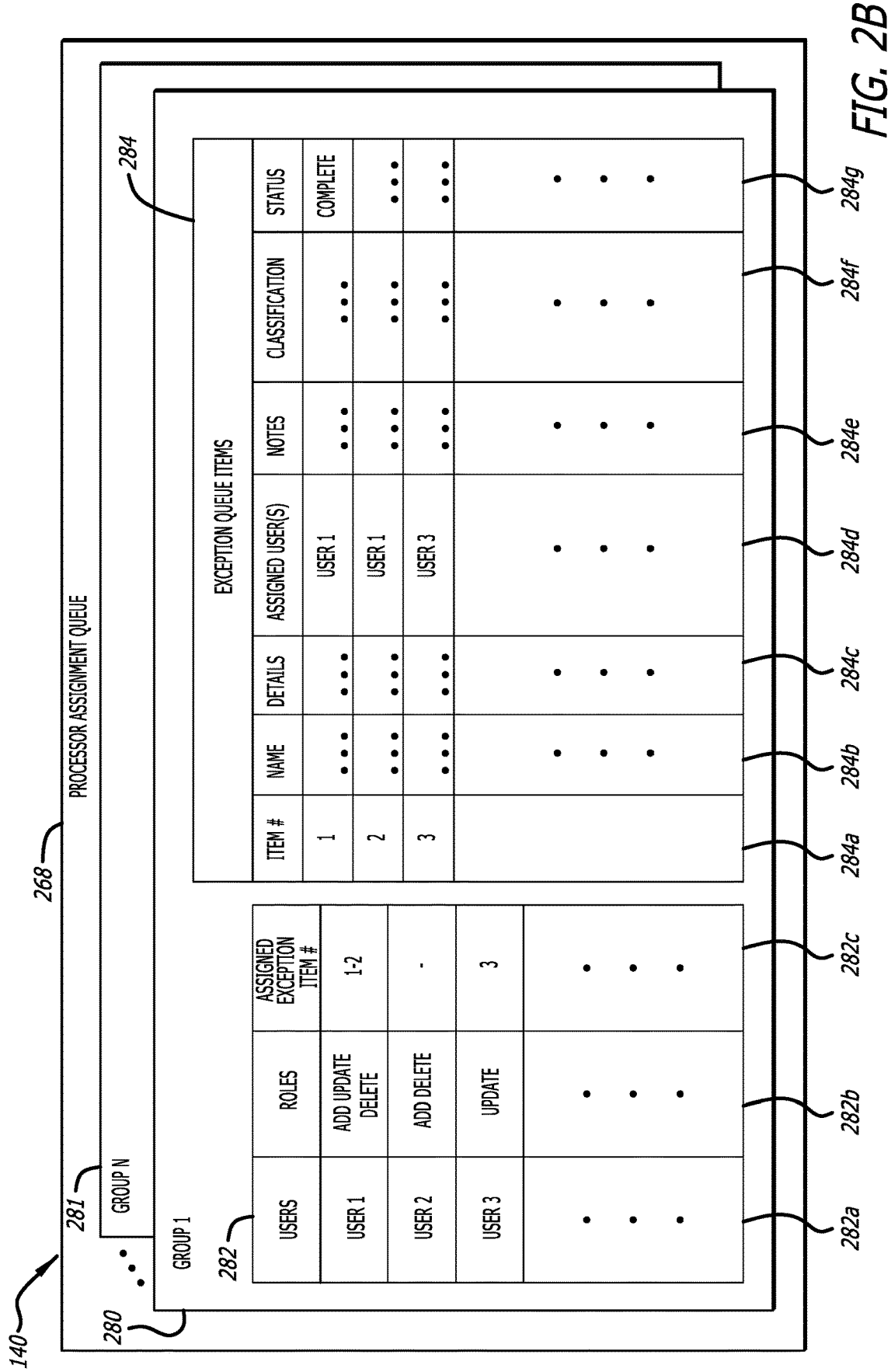
Figure 2C:
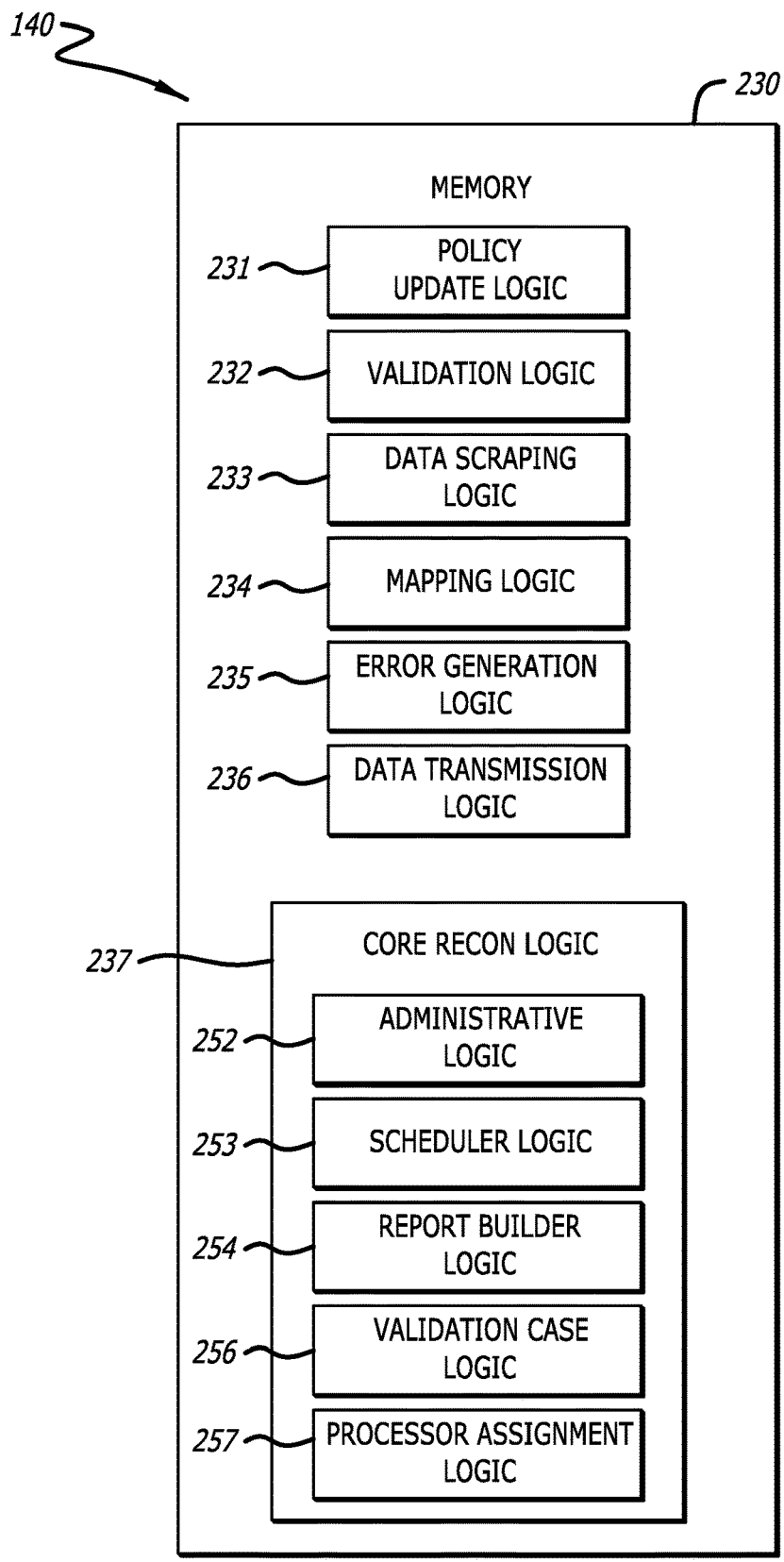

According to embodiments depicted in FIGS. 2A and 2C, the memory 230 may include the policy update logic 231 configured to facilitate a policy profile update process and/or any other policy update related processes. The policy update logic 231 may coordinate the process of anticipating and generating various data points within a number of policies to seek out for updating. In the embodiments, this coordination may occur in conjunction with any other logics 231-237, 252-256 depicted in FIG. 2C along with any available data 241-249, 250-251 depicted in FIG. 2D. For example, the policy update logic 231 may be configured to facilitate the core recon logic 237 and/or the core recon data 246 depicted in FIGS. 2C-2D for updating any data points associated with any number of policies in response to receiving any validated and reconciled data points from the core recon unit 260. In certain embodiments, the policy update logic 231 may initiate the policy update process in response to one or more predetermined thresholds being exceeded. The thresholds and evaluations of exceeding them may be directed by the policy update logic 231.

In various embodiments, the validation logic 232 depicted in FIG. 2C may be utilized to access any particular data that is otherwise not available to the public. For example, the validation logic 232 may be utilized to access CMS data, independent systems data, and/or the like that may otherwise not be available to the public and/or the core recon device 140. CMSs, independent systems, and so on may be deployed with one or more publicly facing interfaces such as a hypertext markup language (HTML) server style webpage or website. As such, certain policy data available through a CMS website, an independent system website, etc., may have limited access to only grant access to a user with a particular authorization based on credentials and so on. Typically, an agent/broker may have the necessary and proper credentials needed to access non-public CMS and/or independent system webpages.

As such, the validation logic 232 may be configured to automate the process of gaining access to non-public CMS webpages, independent system webpages, and/or any other restricted webpages. In certain embodiments, a user, such as an agent, a broker, a processing staff, etc., may securely store their credentials within the validation logic 232, which may be used to input the credentials when prompted by any non-public webpages. For example, as various processes described herein may include a plurality of data points related to various policies, carriers, independent systems, and so on, users may utilize the validation logic 232 to store multiple credentials with the necessary login information, such that the agent/broker is not prompted numerous times to login during any of these processes, including when validated case queries are scheduled at a high frequency and during off-hours.

Indeed, certain carriers and independent systems may require inputting credentials at various rates and frequencies. For example, one carrier/independent system may need to verify credentials upon viewing each non-public CMS/independent system webpage, while other carriers/independent systems may store credential authorizations within cookie formats that grants users access during particular extended time periods. The validation logic 232 may be configured to track and anticipate those authorization rules, which, in certain embodiments, may be utilized by the mapping logic 234 to better optimize the scraping process, the scheduler logic 253 depicted in FIG. 2C to better optimize the validation case querying process, and so on.

In some embodiments, the data scraping logic 233 depicted in FIG. 2C may be configured to directly interface and gather various data from any of the CMSs, independent systems 180, and/or the like. For example, as described above, CMS webpages may be utilized to find policy profile data that may be more up to date compared to the currently stored policy data 250 depicted in FIG. 2D; whereas independent system webpages may be utilized to find operational/financial data that may be used for key transactions and may require further validation for accuracy (and/or the like) compared to the currently stored independent systems data 245 depicted in FIG. 2D. In additional embodiments, the data scraping logic 233 may scan the CMS webpages, independent system webpages, etc., to determine one or more fields, data points such as data point data 251 depicted in FIG. 2D, and/or any other desired information, and to then copy/update such data from the scanned CMS/independent system webpages to one or more data types in the data store 240, such as the scraped data 243, the validation query data 248, and any other desired data type within the data store 240 depicted in FIG. 2D.

In some embodiments, scraping may be accomplished through HTML and/or cascading style sheet (CSS) tag identification processes. In other embodiments, scraping may be implemented with any other known processes. In more embodiments, the location of data to scrape may be determined from one or more templates and/or other pre-configured processes which may be preconfigured for each specific page. In certain embodiments, the data scraping logic 233 may compare the data to be scraped against one or more of the currently stored policy data 250, data point data 251, validation query data 248, etc., to verify the scraping process is operating correctly before continuing. For example, when scraping for a particular calendar date, the data scraping logic 233 depicted in FIG. 2C may initially attempt to verify that the target data to scrape is in the format of a calendar date, and may thereafter attempt to implement a comparison to verify that any difference in data prior to storage within the scraped data 243 and/or any other data types in the data store 240 depicted in FIG. 2D.

In embodiments, the mapping logic 234 depicted in FIG. 2C may be configured to more efficiently direct the scraping process, for example, in conjunction with the data scraping logic 233, by generating a more efficient order of operations. In some embodiments, the mapping logic 234 may also be configured to facilitate the validation and reconciliation processes, for example, in conjunction with one or more data logics within the core recon logic 237. For example, if a CMS webpage, an independent system webpage, and so on comprises multiple data points that are sought, the mapping logic 234 may direct the data scraping logic 233, the validation case logic 256, and/or the like to load the respective webpage a single time and to then pull and process the multiple data points prior to loading another page, as compared to loading the same respective webpage over and over again for each data point sought. In additional embodiments, the mapping logic 234 may also receive policy data 250 and/or independent systems data 245 from multiple carriers and/or independent systems for processing, which may yield a mapping that organizes the respective loads accordingly and sorts them by the respective carriers/independent systems to further reduce the amount of validation logins, CMS/independent systems webpage loads, and so on.

In many embodiments, the mapping logic 234 may receive data relating to pools of various data types and/or data points that are requested to be updated prior to web scraping. In response to receiving this data, the mapping logic 234 may generate a scraping map that may direct the entire process of data scrapping and/or validation case querying such that one or more efficiencies are better realized. In some embodiments, the mapping logic 234 may account for available computing and or network resources when generating a map. For example, the core recon device 140 may have multiple available network connections to one or more of the independent systems 180, the CMSs, and/or the like. That is, a map may be generated by the core recon device 140 that may reduce processing time by utilizing the known available connections to scrape multiple independent systems 180 at once. This type of mapping may, in certain embodiments, take into account current or know network conditions, independent systems/CMSs loading and response times, and so on.

In embodiments, the error generation logic 235 depicted in FIG. 2C may be utilized to generate and provide users with notifications that one or more errors have occurred during any processes described herein. For example, errors may be generated in various ways including, but not limited to, invalid credential errors, particular desired data not found errors, invalid data format or output type errors, and so on. Errors may be in the form of screen prompts, emails, text/SMS messages, and/or the like. As such, the response of the core recon device 140 to one or more errors may be preconfigured and/or personalized based on the particular processes, data sought, users, processor groups, and so on. For example, responses to the errors may include, but are not limited to, continuing, stopping, delaying, and/or requiring acknowledgment prior to continuing with the respective processes as configured/personalized. It should be understood that any error generation logic, such the error generation logic 235, may be configured with a catch all error generation associated with an unidentified error, without limitation.

In further embodiments, the data transmission logic 236 depicted in FIG. 2C may facilitate the transfer of the data from the core recon device 140 to the AMS, the one or more independent systems 180, and/or the like. As described above, the one or more depicted processes such as the validation and reconciliation processes may generate scraped data 243 and/or independent systems data 245 within the data store 240. As such, in the embodiments, the data transmission logic 236 may be configured to process and/or format one or more data types such as the scraped data 243, the independent systems data 245, and so on, into another form of available data types such as the policy update data 244, the core recon data 246, and so on. In such embodiments, the data transmission logic 236 may then transmit and/or provide the processed/formatted data to one or more users, customers, systems, and/or the like, such as agents/brokers of the AMS, users of the independent systems 180, users 270 of one or more processor groups 280-281, and so on. The processing of the scraped data 243 may typically be needed as each AMS and/or each independent system may be configured with a unique or otherwise proprietary method of data intake.

For example, various AMSs and/or independent systems may be configured to accept batch data from the core recon device 140 as one or more particular types of formatted files. In the embodiments, the data transmission logic 236 may facilitate the conversion of the raw scraped data 243 to any particular data type of the data store 240 that conforms with the one or more particular types of formatted files, which may then be transferred to a suitable recipient such as an AMS, an independent system, a user, an administrator, etc. However, it should be understood that multiple data formats exist, and in certain embodiments in which, for example, the AMS may not have a direct batch input method, the respective converted data type in the data store 240 may be formatted in any particular form that allows for the batch input via any separate programs, automation tools, and/or any other known formatting processes, without limitation. As such, it should be understood that any logics, such as the data transmission logic 246, may be configured to format or otherwise process any available data types in the data store 240, such as the scraped data 243, the independent systems data 245, the validation query data 248, etc., to any other suitable format for processing by an AMS, an independent system, a user, and so on.

Furthermore, as described above in various embodiments, the core recon device 140 may also include the core recon logic 237 which may further include the administrative logic 252, the scheduler logic 253, the report builder logic 254, the validation case logic 256, and/or the processor assignment logic 257. In embodiments, the core recon logic 237 may be configured to more efficiently manage and direct the one or more processes involved with the core recon unit 260 by facilitating more efficient related processes and/or orders of operations for the core recon unit 260 and/or any related components, devices, systems, etc.

In particular, in many embodiments, the core recon logic 237 may be configured to utilize any of the one or more particular components within the core recon unit 260 including, but not limited to, an administrative module 262 with users 270, roles 271, groups 272, user/group assignments 273, access requests 274, and user audits 275; a scheduler module 264 with a scheduler for validation cases 276; a report builder module 265 with a build custom/dynamic validation cases reporter 277; a validation case engine 266 with a query engine 278 and a query builder 279; and a processor assignment queue 268 with a plurality of processor groups 280-281, a plurality of users/roles assignments 282, and a plurality of exception queue items 284. Furthermore, in certain embodiments, the core recon logic 237 may be configured to facilitate any AMSs, CMSs, and/or independent systems by enabling cross-platform validation and reconciliation of data stored across any of their respective data stores, such as the data stores 201-205 of the independent systems 180 depicted in FIG. 2A. For example, the core recon logic 237 may be configured to facilitate an AMS by implementing one or more of the available logics 252-256 to identify any particular types of discrepancies based on any scraped, received, and/or validated data, and to respectively rectify those identified discrepancies into reconciled data that may be inputted into the processor assignment queue 268 and filtered into at least one of the processor groups 280-281 for review by the users 270 assigned to the respective processor group(s) 280-281.

As described above, the core recon logic 237 may be configured to enable the core recon device 140 to have the necessary logics used for any particular data processing capabilities, which may be used to query any particular data across various platforms for validation and reconciliation purposes from any particular systems, data stores, and/or the like, such as the data stores 201-205 of the independent systems 180. In certain embodiments, the core recon device 140 may utilize one or more of the available logics 252-256 in the core recon logic 237 depicted in FIG. 2C to provide one or more desired functions as required by an AMS, including, but not limited to, data processing, data validation and/or reconciliation, administrative tasks, data retrieval/querying for any scheduled and built validation cases, processing/assigning any particular validated data for further review, and so on. It should be understood that any logics 252-256 in the core recon logic 237 and/or any other logics 231-236 may be utilized by the core recon device 140, independent systems 180, system 200, and/or any other devices, data stores, systems, related methods, etc., to respectively receive any particular type of data and data points and then validate and reconcile such data types and data points, without limitation.

In many embodiments, the one or more available logics 252-256 of the core recon logic 237 may be configured to schedule and build one or more validations cases in conjunction with, for example, the scheduler and report builder modules 264-265 and validation case engine 266; and to subsequently retrieve (i.e., scrape, query, receive, etc.)—in conjunction with, for example, both the query engine and builder 278-279—the scheduled and built data from the generated validations case queries associated with any of the AMSs, CMSs, and/or independent systems 180, such that the retrieved data may be validated and reconciled as the exception queue items 284 assigned to the processor group 280-281 within the processor assignment queue 268.

As described above, users of the core recon device 140, such as administrators and/or any users with managerial/supervisor roles, may be able to perform any number of administrative duties/tasks with the administrative module 262 based on the various objects associated with any of the users 270, roles 271, groups 272, user/group assignments 273, access requests 274, and/or user audits 275. For example, the administrator may utilize the administrative module 262 to assign one user of the users 270 to one processor group of the groups 272 and respectively one or more roles within the roles 271 assigned to the one processor group of the groups 272. In addition, the administrative logic 252 may be configured in conjunction with the administrative module 262 to enable the administrator to have the abilities to grant and/or deny access via the access requests 274, to assign any users 271 with any roles 271 for any processor groups 272 via the user/group assignments 273, to view in an user interface (e.g., a dashboard) any of the users/roles assignments 282 and exception queue items 284 in any of processor groups 280-281 within the processor assignment queue 268, and/or to supervise (i.e., trail) any of the users 270 assigned exception queue items 282/284 via the user audits 275.

In embodiments, the users 270 may be any type of users that may need to utilize the core recon device 140 such as, but not limited to, agents, brokers, processors, processing staff, supervisors, AMS users, independent system users, CMS users, and/or any other desired users. In the embodiments, as depicted in FIGS. 2A-2B, the users 270 may be assigned with any of the various roles 271 such as, but not limited to, add roles, delete roles, update roles, administrative roles, staff roles, validation case schedulers/builders, and/or any other desired roles that may need to be assigned to one or more of the user 270. Furthermore, as discussed above and depicted in FIGS. 2A-2B, the users 270 may be assigned to one or more groups 272 that may be associated with one or more respective processor groups 280-281 within the processor assignment queue 280-281. In the embodiments, the groups 272 and/or the processor groups 280-281 may be any type of processor groups having one or more of the users 270, where the groups/processor groups 272/280-281 may include, but are not limited to, validating data processing groups, error processing groups, validation case processing groups, staffing groups, data formatting groups, and so on.

In most embodiments, one user 270 may have several different roles 271 associated with several different processor groups 272/280-281. For example, this may allow the one user 270 to select and work on any exception queue items 284 in the processor assignment queue 268 that are assigned to the user's processor groups 272/280-281, and that satisfy the necessary roles 271 needed by the one user 270 to work on the selected exception queue items 284. In some embodiments, the one user 270 may click on the one or more exception queue items 284 within the one or more assigned process groups 272/280-281 that the one user 270 intends to work on and then click a "Get Next" button (or the like) to be served their first exception queue item 284 within the processor assignment queue 268.

In the embodiments, the one or more exception queue items 284 are then assigned to that one user 270 and may be trailed or searched by other users 270 with the users/roles assignments 282, which generates a list of users 270 with their assigned roles 271 and their exception queue items 284 as depicted in greater detail in FIG. 2B. As such, once the one user 270 has the particular exception queue item 284 to work on, the particular exception queue item 284 may be represented with an exception's item detail page depicted in FIG. 2B, which may show one or more fields 284*a*-284*g* associated with the particular exception queue item 284 including, but not limited to, an identification item number 284*a*, a name 284, a detail section to add details of the particular exception queue item 284, one or more assigned users 284*d*, a notes section for the one user 270 to document any desired notes involved with the particular exception queue item 284, a classification field 284*f*, and a status field 284*g* which may indicate the status of the one user 270 in regards to the work done on the particular exception queue item 284 (e.g., the status field may indicated that the items are completed, in progress, reassigned, in review, etc.).

Moreover, if the one user 270 is able to work towards resolving the one or more issues involved with the particular exception queue item 284 on their own, the one user 270 may do so external to the core recon device 140 in one or more processes that may be determined by each type of exception queue items 284. Once resolved, the one user 270 may be able to enter his notes of the issue(s) in the notes section 284*e* under that particular exception queue item 284, to classify that item 284 with the classification field 284*f*, and to then mark that item 284 complete under the status field 284*g*. Alternatively, if the one user 270 may not be able to resolve that item 284, the one user 270 may click a "Skip" button and then that item 284 may re-enter the processor assignment queue 268, where the one user 270 may also be able to provide their notes under the notes section 284*e* in regards to one or more reasons for not being able to resolve the issue(s) of that item 284. Additionally, in certain embodiments, if the one user 270 determines that they may only be able to work that item 284 to a certain point and feels that another processor group 272/280-281 may be needed to take the next step toward resolving the issue(s), the one user 270 may have an option to enter in some notes in the notes section 284*e* and re-assign that item 284 to any other processor group 272/280-281.

Furthermore, as discussed above, a supervisor, an administrative, and/or the like may be able to run reports with the scheduler and report builder modules 264-265, such that the supervisor/administrator may analyze any processor groups' queues 280-281 and their respective exception items 284 as well as who or what users 270 are assigned to what items 284 as depicted with the users/roles assignments 282 in FIGS. 2A-2B. Custom reports of any particular type of data may be able to be scheduled and built in the core recon device 140 via the scheduler and report builder modules 264-265 and then made available to any desired users 270 based on their assigned roles 271 and processor groups 272/280-281. In addition, administrative developers may be able to utilize the validation case engine 266 of the core recon device 140 to build one or more validation case queries via the query engine and builder 278-279, which may be one or more structured query language (SQL) query engines and/or builders, and to also schedule when the one or more validation case queries for data may be initiated via the scheduler for validation cases 276 in the scheduler module 264. As discussed above, in most embodiments, the validation cases (or validation case queries) may be as simple or as complex as needed by the core recon device 140, the respective AMS, and/or the like. For example, the degree of simplicity/complexity of each validation case that is built and run by the core recon device 140 may be based on the particular data types and data points being queried, the number of disparate cross-platform systems and data stores being used to retrieve that particular data, the level of accessibility needed to be granted access to retrieve that particular data, the particular frequency, duration, and time/dates being scheduled to retrieve that particular data, and so on. It should be understood that the core recon device 140 may be utilized as the standalone computing device depicted in FIGS. 1 and 2A-2D and as any type of software services such as a subscription type application such as a subscription white label application and/or the like, without limitations.

According to such embodiments, with this flexibility configured into the core recon unit 260, the core recon device 140 may include one or more machine learning/AI processes. For example, the core recon device 140 may have the machine learning/AI processes built into one or more selected validation case queries to facilitate the data validation and reconciliation processes by better classifying and filtering what particular exception queue items 283 truly need to be reviewed by the particular processor groups 272/280-281 and respective users 270.

As described in greater detail below in method 500 depicted in FIG. 5, the machine learning/AI processes may be configured to generate increased efficiency within the core recon device 140. By way of example, the machine learning processes within one or more of the available logics 231-237, 252-256 in the memory 230 depicted in FIGS. 2A and 2C may be configured to evaluate each data points and/or each data point types within the available data types and data points 241-249, 250-251 in the data store 240 depicted in FIGS. 2A and 2D, and may be configured to then generate at least a probability that is associated with the likelihood that the particular data point and/or data point type is a potentially stale data point and/or the like. For example, as depicted below in greater detail, the potentially stale data point may include data points and/or data types that may be currently incorrect or otherwise out of date (i.e., "stale"), otherwise non-current, otherwise correct and repeatedly rectified, constantly reoccurring (i.e., highly expected), and so on. In this way, the machine learning/AI processes may exclude or limit the data sought through the validation and reconciliation processes. This machine learning/AI-based process may further be enhanced by generating ground truth data based on the results of the validation and reconciliation processes, which may be used within a closed loop to retrain the one or more machine learning/AI processes (e.g., via a reweighting of a model, etc.).

Figure 2D:
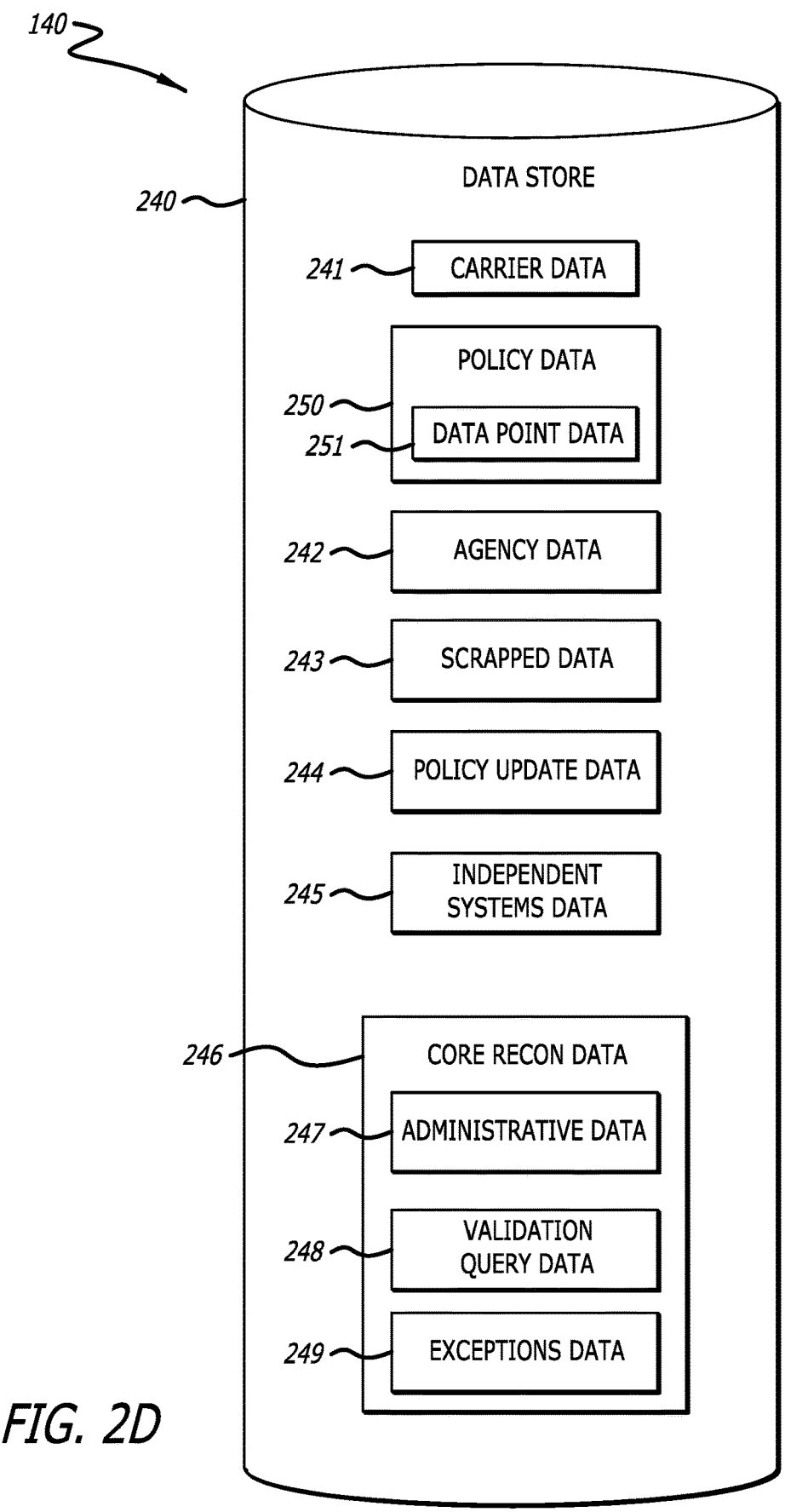

In addition, as described above, the data store 240 may be configured as a physical storage device within the core recon device 140 as depicted in the embodiments depicted in FIGS. 2A and 2D. In additional embodiments, the data store 240 may be a separate or external device physically connected to the core recon device 140. In further additional embodiments, the data store 240 may be situated in a remote client, such as a cloud-based server or the like, and provides data read/write access in response to the core recon device 140. It should be understood that any formats, types, and data points of data available within the data store 240 may be utilized in any desired configurations and may thus vary greatly and be configured as needed, which includes combining, omitting, and/or adding one or more data structures, without limitations.

In embodiments, the carrier data 241 may comprise data specific to each of a plurality of insurance carriers that the AMS may interface with. By way of non-limiting examples, the carrier data 241 may include CMS types, CMS location/web addresses, agent/broker carrier credentials, preconfigured carrier scraping templates, publicly available data points, and/or links to associated data corresponding to any available data in the data store 240. It should be understood that any carrier data 241 and independent systems data 245 may be stored as separate data files or may be realized as a single multi-dimensional data structure, without limitation.

In embodiments, the policy data 250 may include any data related to one or more policies associated with the AMS. An agent/broker may have numerous customers with a plurality of policies between them. Each policy may be associated with unique policy data 250 and/or unique independent systems data 245. It should be understood that the policy data 250 may include any high number of separate account files, where each unique policy data 250 may be associated with a single policy that comprises a plurality of individual or atomic pieces of data point data 251.

Data point data 251 may be associated with, for example, each insurance policy that may have discrete pieces of data associated with that policy. Furthermore, many discrete pieces of data may be duplicated or repeated over many different accounts. For example, each policy is likely to be associated with a customer, each policy may have a policy number or other identification data, each policy may have a current status, billing address, billing method, and/or billing history. It should be understood that any policy data 250 may comprise many more types of data point data 251 although not directly depicted in FIGS. 2A-2D, without limitation.

For example, it may be during the policy profile update process that the data point data 251 is checked and updated. The updating of the various data point data 251 may yield an overall current policy data 250 for each policy. In some embodiments, the policy profile update process may simply receive an external mapping or may be preconfigured to scrape all data and pass it off to the AMS for further processing, comparing, and/or updating. In certain embodiments, the policy data 250 may not be present within the core recon device 140. Those particular embodiment may be more suitable for security-conscious applications, where the processing, for example, is implemented on an external server, device, or mobile computing device susceptible to theft and/or the like.

In many embodiments, the agency data 242 may comprise data related to the specific agency utilizing the core recon device 140. For example, the core recon device 140 may be operated by a third party (i.e., not owned by the agency/broker utilizing it) in which the data relating to each agent, broker, vendor, independent system, etc., that may utilize the core recon device 140 is stored within the agency data 242. In other embodiments, an agent, a broker, and/or the like may operate under multiple business names and/or jurisdictions which may require specialized rules to comply with various laws, regulations, and so on. Agency data 242 may be utilized to change one or more related methods of operation based on the legal entity that is currently operating the core recon device 140. Finally, the agency data 242 may also indicate what particular data types and/or data points from the data stores 201-205 of the independent systems 180 may be key to that particular agency's business processes and operations, such that the validation case queries may focus more on those indicated data types and data points when scheduling and building such data queries.

In various embodiments, the scraped data 243 may simply be the raw data that is taken from one or more CMSs, third party systems, and/or independent systems 180 by one or more available data logics such as the data scraping logic 233 and the validation case logic 256. In some embodiments, the scraped data 243 may be in various formats which may include a multitude of various individual pieces of data points and/or data types, and/or may include one or more logs or other single data structures that are appended in response to new data being scraped and stored. In certain embodiments, the scraped data 243 may comprise data that has already been parsed and validated as new data or more current data. In other embodiments, the scraped data 243 may simply be a collection of data reads, and/or otherwise raw data that is evaluated by one or more available logics in the memory 230, such as the data scraping logic 233 and/or the validation case logic 256, prior to being processed, validated, and/or reconciled into one or more respective available data types in the data store 240.

Lastly, as described above in great detail, it should be understood that any logics and data types of the core recon device 140 may be configured and utilized for various purposes and processes described herein, which may include, but are not limited to, enabling cross-platform verification and reconciliation of key data across various disparate systems and data stores such as the independent systems 180 and the data stores 201-205; validating that the values of the key data points of that data from each data store 201-205 matches with each other and any current data in the data store 240, where that data may have been scheduled and built with the validation case engine 266; ensuring that the validated data from each data store 201-205 may be present and consistent with the desired data points, fields, information, data types, and so on; flagging any discrepancies from the validated data that may be missing, inconsistent, and/or need further review; queuing flagged validation items as the exception queue items 284 for one or more of the processor groups 280-281 to further review; reconciling all exception queue items 284 by properly classifying and filtering such items 284 into the respective processor groups 280-281 in the processor assignment queue 268; enabling authorized users 270 to access the processor assignment queue 268 and work any queued exception items 284 based on their assigned processor groups 272/280-281 and roles 271 as depicted in the one or more fields 282*a-c* of the users/roles assignments 282; and utilizing machine learning capabilities with the validation data queries configured by the validation case engine 266 to remove the need to look at any correct data items and only provide the data items that truly need further review by the users 270 of the processor groups 280-281.

Referring now to FIG. 3, a detailed flowchart illustration of a method 300 is shown for a core recon system to enable cross-platform validation, reconciliation, and cleansing of data points is shown, in accordance with an embodiment of the present disclosure. The method 300 in FIG. 3 depicts embodiments of one or more process flows described herein. For example, the method 300 may be implemented for insurance systems (or the like) to perform cross-platform validations and reconciliations of data points across disparate independent systems and data stores. Furthermore, the method 300 may be implemented with a core recon device which enables clients, users, and the like to identify discrepancies within the validated data points and work towards rectifying those identified discrepancies as reconciled data points through one or more processor groups and processor assignment queues with exception items. In embodiments, the core recon device may be substantially similar to the core recon device 140 depicted in FIGS. 2A-2D.

At block 310, the method 300 retrieves and/or receives data from a plurality of independent systems with data stores. For example, the method 300 may implement a scheduler module and/or a report builder module to schedule and build one or more validation cases, which may be used with a validation case engine to query the data from the data stores of the independent systems. The scheduler and report builder modules and validation case engine may be substantially similar to the scheduler module 264, report builder module 265, and validation case engine 266 depicted above in FIG. 2A. At block 320, the method 300 validates one or more key data points from the retrieved data of each data store of the independent systems. At block 330, in response to validating the key data points, the method 300 determines whether all validated key data points from each data store matches with the other data stores. For example, the method 500 may determine that the values of the validated key data points from the data retrieved from each data store matches with each of the other respective data stores. In response to determining that all key data points are matched, the method 300 proceeds to block 340 and then evaluates that the retrieved data is present and consistent across all data stores. Whereas, in response to determining that not all key data points are matched, the method 300 may then proceed to block 360.

Meanwhile, at block 350, the method 300 determines whether any discrepancies are identified from the evaluated data. In response to determining that one or more discrepancies are identified and/or that not all key data points are matched, the method 300 proceeds to block 360 and then flags the identified discrepancies as one or more validation items for review. For example, the method 300 may flag any discrepancies identified from the evaluated data that may be missing, inconsistent, and/or need further review. Whereas, in response to determining that no discrepancies are identified, the method 300 may then proceed to the end of the depicted flowchart. At block 370, the method 300 queues the flagged validation items as a set of exception items for a processor group. For example, the method 300 may establish a queue of flagged validation items to be represented as a list of exception queue items in a processor assignment queue that needs further review by the processor group. The processor group(s) and exception queue items of the processor assignment queue may be substantially similar to the processor groups 280-281 and exception queue items 284 of the processor assignment queue 268 depicted above in FIG. 2A.

At block 380, the method 300 reconciles all sets of exception items for all processor groups to review in the processor assignment queue. For example, the method 300 may reconcile all sets of exception items from one or more queried validation cases in the processor assignment queue to be reviewed by one or more processor groups. At block 390, the method 300 enables one or more authorized users to access the processor assignment queue and work on any of the queued exception items based on their assigned processor groups and roles. For example, the method 300 may enable an authorized user to access the processor assignment queue and work on any of the queued exception items in the processor assignment queue, which the user is authorized and assigned to work on based on the user's assigned processor groups and roles for each of those assigned processor groups.

Referring now to FIG. 4, a flowchart illustration of a method 400 is shown for administering users of a core recon device having processor groups, user roles, and a processor assignment queue with exception items, in accordance with an embodiment of the present disclosure. The method 400 in FIG. 4 depicts embodiments of one or more process flows described herein. For example, the method 400 may be implemented for insurance systems to perform cross-platform validations and reconciliations of data points across disparate independent systems and data stores. Furthermore, the method 400 may be utilized by administrators, clients, and so on to manage and oversee users of a core recon device/system, which includes processor groups, user roles, and a processor assignment queue with exception items. In embodiments, the core recon device/system may be similar to the core recon system 100 depicted in FIG. 1 and/or the core recon device 140 depicted in FIGS. 2A-2D.

At block 410, the method 400 receives a login request from a user. For example, the method 400 may implement a core recon unit to receive the user's login request. At block 420, the method 400 validates one or more credentials of the user based on the login request. For example, the method 400 may utilize an administrative module with an access request module that may be used to authenticate the user's credentials and respectively authorize/grant or deny access to the user based on the user's authenticated credentials from the login request. At block 430, the method 400 grants the user access to a processor assignment queue with a plurality of exception items corresponding to one or more processor groups. For example, the method 400 may authorize the user to access the processor assignment queue 268 depicted above in FIGS. 2A-2B.

At block 440, the method 400 determines one or more processor groups and roles assigned to the user. For example, the method 400 may utilize one or more users, roles, and groups modules in conjunction with a user/group assignment module that may be combined and used to identify the assigned groups and roles of the user. Both of the users, roles, and groups modules and user/group assignment module may be substantially similar to the users module 270, the roles module 271, the groups module 272, and the user/group assignments module 273 depicted above in FIG. 2A. At block 450, the method 400 receives a work request from the user to work on one or more exception items from one of the assigned processor groups in the processor assignment queue. At block 460, the method 400 assigns the one or more exception items to the user based on the work request being authorized in view of the user's assigned roles in the particular assigned process group. At block 470, the method 400 updates the processor assignment queue with any exception items resolved, skipped, and/or reassigned by the user.

Figure 5:
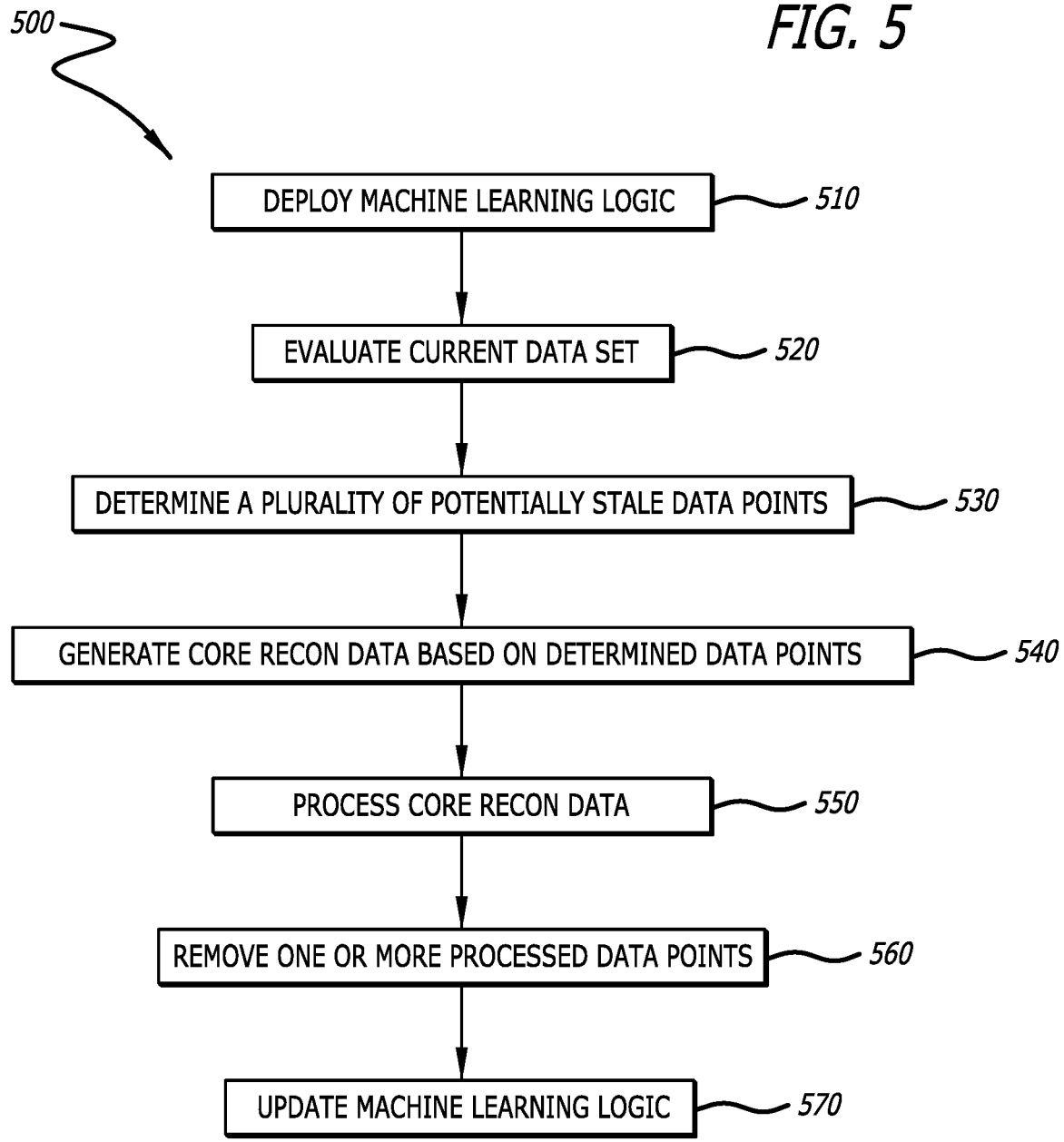
FIG. 5 is a high-level flowchart illustration of a method for implementing machine learning processes with validation data queries to update a core recon device, in accordance with an embodiment of the present disclosure.

Referring now to FIG. 5, a high-level flowchart illustration of a method 500 is shown for implementing machine learning processes with validation data queries to update a core recon device, in accordance with an embodiment of the present disclosure. The method 500 depicted in FIG. 5 may be implemented for any type of insurance systems to perform cross-platform validations and reconciliations of data across various disparate independent systems and data stores. In particular, there is a desire to create efficient validating and rectifying processes/methods to keep AMS policy data current with CMS policy data and independent systems data. Machine learning and AI processes may facilitate this by fine-tuning such processes of the AMSs, CMSs, and/or independent systems described herein. As such, an example use of machine learning and AI data processing within a core recon system is depicted with the method 500 in FIG. 5. For example, the method 500 may be implemented with a core recon device, which is configured to utilize machine learning and AI to particularly better classify and filter what items need to be reviewed by processor groups, and to better identify what items are correct and provide only the items that need further review to the processor groups. The core recon system and device described in FIG. 5 may be substantially similar to the core recon system 100 described in FIG. 1 and the core recon device 140 depicted in FIGS. 2A-2D.

At block 510, the method 500 deploys one or more machine learning logics. As described in the embodiment above, machine learning and/or AI logic may be incorporated within one or more of the logics of the core recon device depicted in FIGS. 2A-2D, such as a more personalized core recon logic, validation logic, data scrapping logic, validation case logic, and so on. However, in certain embodiments, machine learning/AI logic may be deployed but may be activated separately and/or in response to one or more conditions/predetermined thresholds being met such as a software and/or hardware upgrade. Once available, the machine learning/AI logic may begin to focus the selection of specific data points to better classify and filter data items for review.

At block 520, in order to generate inferences or other informed predictions, the method 500 evaluates the current data within the core recon device and/or the associated AMS. In the embodiments, the method 500 may first evaluate the current data sets within the core recon device and/or the respective AMS, which may include evaluating the data points from the current data within the sets of exception queue items in a processor assignment queue. For example, the evaluated data may include any current data gathered from one or more scheduled queries associated with one or more validation cases. As depicted in the embodiments above, administrative developers may be able to utilize the core recon device (or application) to build the validation case queries in a SQL query builder as well as schedule when the validation case queries should run, where each validation case may be designed as simple or as complex as desired. With this flexibility, the machine learning/AI logic may be built into some of the validation cases to better classify and filter what will actually need to be reviewed by processor group users. Moreover, in certain embodiments, the initial data needed to operate the machine learning/AI processes may be provided as a preconfigured weight set summarized within an anonymized set of training data, which may or may not be associated with the current data within the core recon device and/or AMS. Finally, in other embodiments, one or more manual inputs may be submitted to generate a set of initial ground truth data points for the machine learning/AI processes to initially utilize for the current data set.

At block 530, once configured, the method 500 determines a plurality of potentially stale data points from the evaluated data, such as, but not limited to, any potentially stale and/or otherwise non-current data points, any potentially correct and/or rectified data points, any potentially reoccurring and/or constant discrepancies in the data points, and so on. In various embodiments, the method 500 may make this determination based on a number of factors including, but are not limited to, the type of data evaluated (e.g., billing info tends to change more frequently than dates of birth, etc.), the time since the last update (e.g., updates to billing payments are not likely to change in under one month), and/or the overall history of the policy (e.g., younger customers are more likely to change data compared to older customers). The determination of stale validated data points may occur as frequently or infrequently as required by the desired application. Based on these types of evaluations and/or validations, a probability may be determined on each validated data point indicating the change of the data being updated.

At block 540, once one or more stale data points have been determined, the method 500 generates one or more core recon data points that need to be scraped for further review and verify their accuracy. For example, as opposed to embodiments where a list of data points and policies to review/verify are simply received by the core recon device, the machine learning/AI processes may internally generate data points to further review and verify. This helps to increase system efficiency by anticipating and automating the validation/verification and reconciliation of data from any of AMSs, CMSs, and/or independent systems. In addition, this helps to significantly increase productivity gains for insurance systems, customers, and clients, but also enhances productivity by providing morale boosters to the processing groups, staffs, and users as their work may necessitate more of their cognitive ability compared to their manual labor. Finally, once generated, the one or more generated core recon data points/lists may be utilized by the core recon device and/or AMS and/or may be transmitted to another device for further processing and updating.

At block 550, the method 500 then processes the generated core recon data. In most embodiments, this may be accomplished in a manner similar to the discussion above with respect to the one or more steps depicted in FIG. 3. At block 560, during or after processing the core recon data, the method 500 ultimately removes one or more data points based on, for example, the initial determinations of the one or more evaluated data points. Once received, the machine learning/AI processes may compare the recently scraped/updated data point data with the determined probability associated with that data point. In response to the comparison, a determination may be made related to the accuracy of the determined probability of that data point in regard to, for example, accuracy, redundancy, relevance, and/or the like to then remove the one or more determined data points. For example, the machine learning/AI processes may therefore help to remove the need to look at those one or more determined data points that are correct (or redundant, unnecessary, irrelevant, etc.) and only provide the other validated data points that do need further review by the processing users.

At block 570, the method 500 finally updates the one or more machine learning logics in response to the one or more removed data points. It should be understood that any determinations of any correct inferences and/or predictions made by the machine learning/AI processes may be configured to strengthen the relative associations (i.e., weights) with such determinations, while an incorrect inference/prediction may have the opposite effect. In certain embodiments, the one or more steps of the machine learning/AI processes may be automated processes. However, other embodiments may provide a method for ground truth generation by allowing a user, such as an agent/broker using a core recon device and/or an AMS, to verify the correctness of the scraped validated data. This process may continue the training process of the one or more machine learning/AI processes within the core recon device/system.

Figure 6:
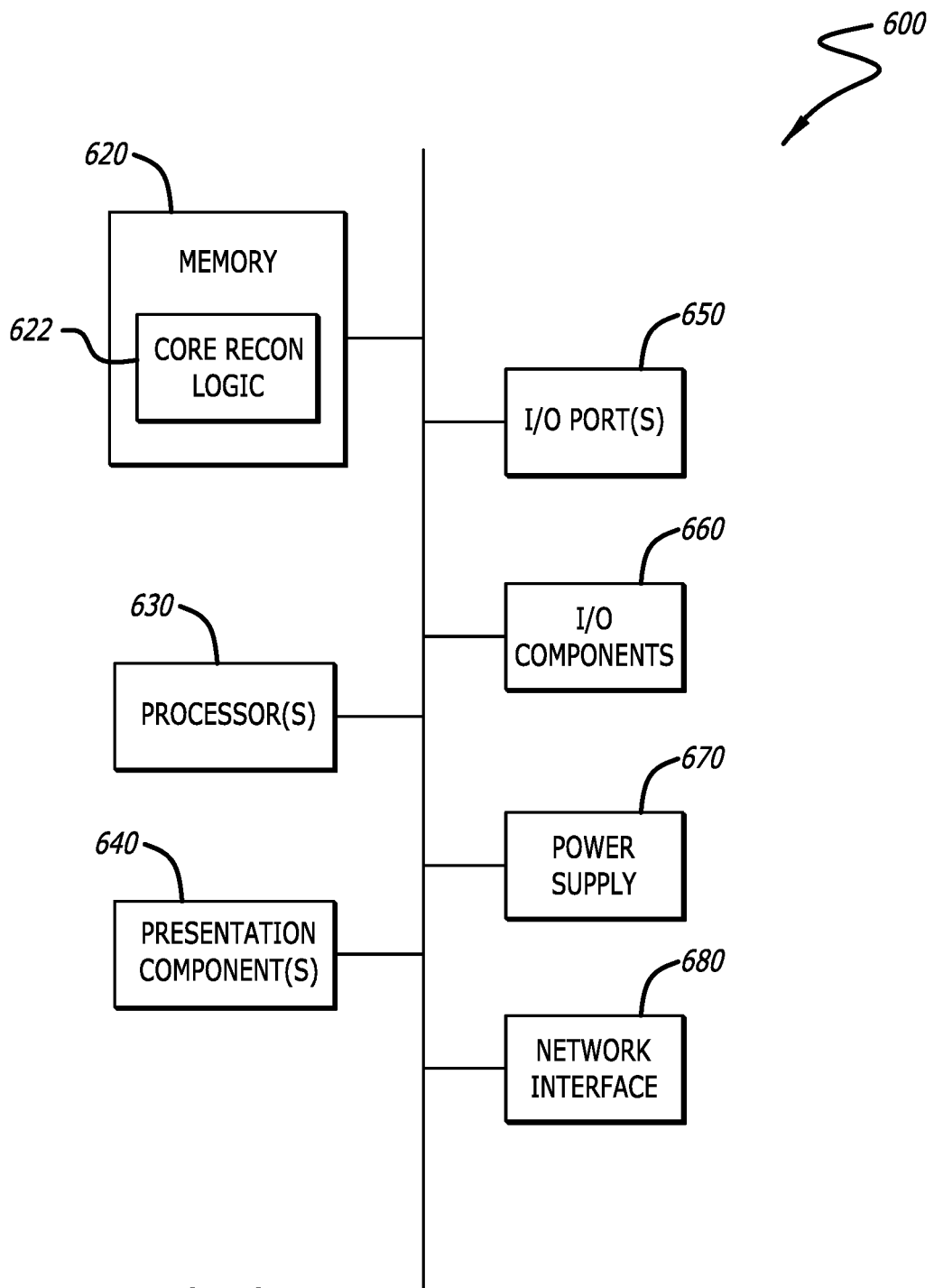
FIG. 6 is a schematic illustration of a computing system which may be used in accordance with one or more embodiments of the present disclosure.

Referring now to FIG. 6, an exemplary schematic of a computing system 600 is shown, in accordance with an embodiment of the present disclosure. In embodiments, the computing system 600 may be implemented to create a way for insurance systems to perform cross-system validations and reconciliations of data points across disparate independent systems. In particular, the computing system 600 may be implemented as a core recon system/device that enables clients, users, etc., to focus on identifying discrepancies within the validated data points and work towards rectifying those identified discrepancies as reconciled data points via a processor assignment queue of the core recon system/device, as described herein. For example, the computing system 600 may be similar to the core recon system 100 depicted in FIG. 1 and/or the core recon device 140 depicted in FIGS. 2A-2D. It should be understood that the computing system (or device) 600 depicted in FIG. 6 is one example of a suitable computing environment and is not intended to suggest any limitation as to the scope of use or functionality of the embodiments of the present disclosure. Additionally, it should be understood that the computing system 600 may not be interpreted as having any dependency or requirement relating to any one or combination of components depicted herein.

In embodiments, the computing system 600 may include a bus 610 which directly or indirectly couples the following devices: a memory 620 with adaptive communicative logic 622, one or more processors 630, one or more presentation components 640, one or more input/output (I/O) ports 650, one or more I/O components 660, and an illustrative power supply 670. The bus 610 represents what may be one or more busses (such as an address bus, data bus, and/or a combination thereof). The computing system 600 may include a variety of computer-readable media. Computer-readable media may be any available media that may be accessed by the computing system 600 and includes both volatile and nonvolatile, removable and non-removable media. By way of non-limiting example, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

The memory 620 may include computer storage media in the form of volatile and/or nonvolatile memory. The memory 620 may be removable, non-removable, or a combination thereof. Exemplary memory includes solid-state memory, hard drives, optical-disc drives, etc. The computing system 600 may include one or more processors 630 configured to read data from various entities such as the bus 610, memory 620, and/or I/O components 660. The presentation components 640 may present data indications to users or other devices. Exemplary presentation components 640 include a display device, speaker, printing component, vibrating component, etc. The I/O ports 650 may allow the computing device 600 to be logically coupled to other devices, including the I/O components 660, some of which may be built-in.

In various embodiments, the memory 620 may include, in particular, temporal and persistent copies of core recon logic 622. The core recon logic 622 may include instructions that, when executed by one or more processors 630, result in the computing system 600 performing various functions, including, but not limited to, any steps depicted in the methods 300, 400, 500 of FIGS. 3-5 and/or any other methods and/or implementations depicted herein in relation to FIGS. 1-5.

In some embodiments, one or more processors 630 may be packaged together with the core recon logic 622. In some embodiments, one or more processors 630 may be packaged together with the core recon logic 622 to form a System in Package (SiP). In other embodiments, one or more processors 630 may be integrated on the same die(s) with the core recon logic 622. In certain embodiments, the processors 630 may be integrated on the same die(s) with the core recon logic 622 to form a System on Chip (SoC).

The I/O components 660 may include a microphone, joystick, gamepad, satellite dish, printer, display device, wireless device, a controller (e.g., a stylus, a keyboard, a mouse, etc.), a natural user interface (NUI), and/or the like. Moreover, the networking interface 680 may include a network interface controller (MC) used by the computing system 600 to transmit and receive data. In some embodiments, the networking interface 680 may use wired technologies such as coaxial cable, twisted pair, optical fiber, etc. In other embodiments, the networking interface 680 may use wireless technologies such as terrestrial microwave, communications satellites, cellular, radio and spread spectrum technologies, etc. Particularly, the networking interface 680 may include a wireless terminal adapted to receive communications and media over various wireless networks.

The computing system 600 may communicate via wireless protocols, such as Code Division Multiple Access (CDMA), Global System for Mobiles (GSM), or Time Division Multiple Access (TDMA), as well as others, to communicate with other devices via the networking interface 680. The radio communications may be a short-range connection, a long-range connection, or a combination of both a short-range and a long-range wireless telecommunications connection. A short-range connection may include a Wi-Fi connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using one or more of CDMA, GPRS, GSM, TDMA, and 802.16 protocols.

Information as shown and described in detail herein is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail may be made, without departing from the spirit and scope of the present disclosure, as set forth in the appended claims, as might be apparent to those of ordinary skill in the art, are also encompassed by the present disclosure.

What is claimed is:

1. A reconciliation device for performing cross-system verification across disparate systems to identify and resolve discrepancies, comprising:
   a core reconciliation unit;
   a processor coupled to the core reconciliation unit; and
   a non-transitory computer-readable storage medium for storing instructions that, when executed by the processor, cause the processor to:
   interface with one or more independent systems;
   generate an order of operations for a data scraping process based on the one or more independent systems, wherein the generated order of operations optimizes for at least one of a reduced number of logins or a reduced number of page loads;
   gather a plurality of data points from a plurality of the one or more independent systems based on the generated order of operations, wherein each of the plurality of data points includes a respective data value;
   parse the plurality of data points to prepare the corresponding data values for processing one or more discrepancies that include inaccurate or out-of-sync data values between the plurality of one or more independent systems;
   validate that each data value from each data point from the plurality of one or more independent systems matches with other data values from the other data points from a plurality of one or more other independent systems;
   upon a determination that one or more discrepancies exist within the plurality of data points, generate one or more exception items based on the one or more discrepancies;
   input the one or more generated exception items into a processor assignment queue, and queue the one or more generated exception items into one or more processor groups to be reviewed in the processor assignment queue;
   wherein each of the one or more processor groups is configured to be a computer external to the core reconciliation unit;
   wherein each of the one or more generated exception items is configured for at least two of the following by a user of the one or more processor groups: being reviewed within the processor assignment queue, being resolved in the processor assignment queue, or being reassigned to another one or more processor groups; and
   wherein the core reconciliation unit is configured to build a validation case query based on an update of the plurality of data points or validation of the plurality of data points, and schedule when the validation case query runs.

2. The device of claim 1, wherein the core reconciliation unit comprises an administrative module, a scheduler module, a report builder module, and a validation case engine.

3. The device of claim 2, wherein the processor assignment queue includes a plurality of the one or more processor groups and a plurality of users/roles assignments.

4. The device of claim 3, wherein each processor group of the plurality of one or more processor groups is associated with at least one of the one or more generated exception items, and wherein each of the plurality of users/roles assignments includes one or more fields associated with each exception item within each processor group.

5. The device of claim 4 wherein each of the one or more generated exception items further includes an item identification number, an item name, a detail section, one or more assigned users, a notes section, an item classification, and a status.

6. The device of claim 5, wherein the administrative module further comprises a plurality of users, a plurality of roles, the plurality of one or more processor groups, a plurality of user/processor group assignments, a plurality of access requests, and a plurality of user audits.

7. The device of claim 6, wherein each user is assigned to at least one or more of the one or more processor groups, and wherein each user is assigned with one or more of the plurality of roles based on each assigned processor group.

8. The device of claim 7, wherein each user requires a particular role assigned to a particular processor group for the user to work on a particular exception queue item in the processor assignment queue.

9. The device of claim 2, wherein the validation case engine further comprises a query engine and a query builder, and wherein both the query engine and builder are used to query for the gathered plurality of data points from the plurality of one or more independent systems.

10. The device of claim 1, wherein each of the plurality of one or more independent systems includes one or more data stores.

11. The device of claim 10, wherein the validation of the gathered and parsed plurality of data points from each of the one or more data stores of each of the plurality of one or more independent systems further comprises one or more data transactions, and wherein the one or more data transactions comprise at least one or more of commissions, premium finance funding, cancellations, reinstatements, endorsements, renewals, and bank deposits.

12. The device of claim 1, wherein the non-transitory computer-readable storage medium further comprises one or more logics configured to utilize one or more machine learning processes to determine a probability that each of the plurality of data points is stale.

13. A method for performing cross-system verification across disparate systems to identify and resolve discrepancies with a core reconciliation device, the method comprising:
   interfacing with one or more independent systems;
   generating an order of operations for a data scraping process based on the one or more independent systems, wherein the generated order of operations optimizes for at least one of a reduced number of logins or a reduced number of page loads;

gathering a plurality of data points from one or more data stores associated with a plurality of the one or more independent systems based on the generated order of operations, wherein each of the plurality of data points includes a respective data value;

parsing the plurality of data points from the one or more data stores to prepare the corresponding data values for processing one or more discrepancies that include inaccurate or out-of-sync data values between the plurality of one or more independent systems;

validating that each data value from each data point from each data store of a plurality of the one or more data stores matches with other data values from the other data points from a plurality of the other data stores;

determining whether there are one or more discrepancies within the plurality of data points;

flagging each of the one or more discrepancies as a validation item for review;

generating a plurality of exception items based on the flagged validation items for data reconciliation;

inputting the plurality of generated exception items into a processor assignment queue, and queuing the plurality of generated exception items into one or more processor groups to be reviewed in the processor assignment queue;

wherein each of the one or more processor groups is configured to be a computer external to the core reconciliation device;

wherein each of the one or more plurality of generated exception items is configured for at least two of the following by a user of the one or more processor groups: being reviewed within the processor assignment queue, being resolved in the processor assignment queue, or being reassigned to another one or more processor groups; and wherein the core reconciliation device is configured to build a validation case query based on an update of the plurality of data points or validation of the plurality of data points, and schedule when the validation case query runs.

14. The method of claim 13, further comprising granting one or more user requests from one or more authorized users to access the processor assignment queue and utilize one or more of the plurality of generated exception items within the processor assignment queue.

15. The method of claim 14, wherein the core reconciliation device comprises an administrative module, a scheduler module, a report builder module, and a validation case engine, wherein the processor assignment queue includes a plurality of the one or more processor groups and a plurality of users/roles assignments, wherein the administrative module further comprises a plurality of users, a plurality of roles, a plurality of the one or more processor groups, a plurality of user/processor group assignments, a plurality of access requests, and a plurality of user audits, wherein the validation case engine further comprises a query engine and a query builder, and wherein both the query engine and builder are used to query for the gathered plurality of data points from the one or more data stores within the plurality of one or more independent systems.

16. The method of claim 15, wherein each processor group is associated with at least one or more of the plurality of generated exception items, wherein each of the plurality of users/roles assignments includes one or more fields associated with each exception item within each processor group, and wherein each of the plurality of exception queue items further includes an item identification number, an item name, a detail section, one or more assigned users, a notes section, an item classification, and a status.

17. The method of claim 16, wherein each user is assigned to at least one or more of the one or more processor groups, wherein each user is assigned with one or more of the plurality of roles based on each assigned processor group, and wherein each user requires a particular role assigned to a particular processor group for the user to work on a particular exception queue item in the processor assignment queue.

18. The method of claim 13, further comprising configuring one or more logics within a non-transitory computer-readable storage medium associated with the core reconciliation device to utilize one or more previously trained machine learning processes to determine a probability that each of the plurality of data points is stale.

19. The method of claim 13, wherein the validation of the gathered and parsed plurality of data points from each data store of the one or more data stores of each of the plurality of one or more independent systems further comprises one or more data transactions, and wherein the one or more data transactions comprise at least one or more of commissions, premium finance funding, cancellations, reinstatements, endorsements, renewals, and bank deposits.

20. A core reconciliation system for performing cross-system verification across disparate systems to identify and resolve discrepancies, the system comprising:

one or more core reconciliation devices communicatively coupled to one or more independent systems;

one or more processors coupled to the one or more reconciliation devices; and a non-transitory computer-readable storage medium for storing instructions that, when executed by the one or more processors, cause the one or more processors to:

interface with the one or more independent systems;

generate an order of operations for a data scraping process based on the one or more independent systems, wherein the generated order of operations optimizes for at least one of a reduced number of logins or a reduced number of page loads;

gather a plurality of data points from one or more data stores within a plurality of the one or more independent systems, wherein each of the plurality of data points includes a respective data value;

parse the plurality of data points from the one or more data stores to prepare the corresponding data values for processing one or more discrepancies that include inaccurate or out-of-sync data between the plurality of one or more independent systems;

validate that each data value from each data point from each data store of a plurality of the one or more data stores matches with other data values from the other data points from other data stores of a plurality of the other data stores;

determine whether there are one or more discrepancies within the plurality of data points;

flag each of the one or more discrepancies as a validation item for review;

generate a plurality of exception items based on the flagged validation items for data reconciliation;

input the plurality of generated exception items into a processor assignment queue, and queue the plurality of generated exception items into one or more processor groups to be reviewed in the processor assignment queue;

wherein each of the one or more processor groups is configured to be a computer external to the core reconciliation system;

wherein each of the one or more plurality of generated exception items is configured for at least two of the following by a user of the one or more processor groups: being reviewed within the processor assignment queue, being resolved in the processor assignment queue, or being reassigned to another one or more processor groups; and wherein the core reconciliation system is configured to build a validation case query based on an update of the plurality of data points or validation of the plurality of data points, and schedule when the validation case query runs.

* * * * *